United States Patent
Wang

(10) Patent No.: US 11,323,469 B2
(45) Date of Patent: *May 3, 2022

(54) ENTITY GROUP BEHAVIOR PROFILING

(71) Applicant: Hewlett Packard Enterprise Development LP, Houston, TX (US)

(72) Inventor: Jisheng Wang, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,566

(22) Filed: May 22, 2020

(65) Prior Publication Data

US 2020/0287925 A1    Sep. 10, 2020

Related U.S. Application Data

(63) Continuation of application No. 16/267,696, filed on Feb. 5, 2019, now abandoned, which is a continuation of application No. 14/743,861, filed on Jun. 18, 2015, now Pat. No. 10,212,176.

(60) Provisional application No. 62/015,655, filed on Jun. 23, 2014.

(51) Int. Cl.
*H04L 29/06* (2006.01)
*H04W 4/38* (2018.01)

(52) U.S. Cl.
CPC ........... *H04L 63/1425* (2013.01); *H04W 4/38* (2018.02)

(58) Field of Classification Search
CPC .................................................. H04L 63/1425
See application file for complete search history.

(56) References Cited

U.S. PATENT DOCUMENTS

| | | | |
|---|---|---|---|
| 8,365,283 B1 * | 1/2013 | Satish | G06F 21/564 |
| | | | 726/23 |
| 8,381,289 B1 | 2/2013 | Pereira et al. | |
| 9,288,220 B2 | 3/2016 | Raugas et al. | |
| 2005/0114678 A1 | 5/2005 | Bagga et al. | |
| 2007/0240207 A1 | 10/2007 | Belakhdar et al. | |
| 2009/0199296 A1 | 8/2009 | Xie | |
| 2010/0017870 A1 | 1/2010 | Kargupta et al. | |
| 2010/0077481 A1 | 3/2010 | Polyakov et al. | |
| 2011/0103394 A1 | 5/2011 | Vogt et al. | |
| 2012/0066707 A1 | 3/2012 | Poder et al. | |
| 2012/0137367 A1 | 5/2012 | Dupont | |
| 2013/0086261 A1 | 4/2013 | Lim | |
| 2013/0212680 A1 | 8/2013 | Winn | |
| 2013/0305357 A1 | 11/2013 | Ayyagari | |

(Continued)

OTHER PUBLICATIONS

International Search Report and Written Opinion received for PCT Application No. PCT/US2015/037162, dated Jan. 13, 2016. 5 pages.

(Continued)

*Primary Examiner* — William S Powers
(74) *Attorney, Agent, or Firm* — Hewlett Packard Enterprise Patent Department LP

(57) ABSTRACT

Entity group behavior profiling. An entity group is created that includes multiple entities, where each entity represents one of a user, a machine, and a service. A behavior profile is created for each one of the entities of the entity group. The behavior of each of one of the entities of the entity group is monitored to detect behavior change. An indicator of compromise is detected based on multiple ones of the entities experiencing substantially a same behavior change.

20 Claims, 13 Drawing Sheets

(56) References Cited

U.S. PATENT DOCUMENTS

| | | |
|---|---|---|
| 2014/0007238 A1 | 1/2014 | Magee et al. |
| 2014/0047544 A1* | 2/2014 | Jakobsson ............... G06F 21/55 |
| | | 726/23 |
| 2014/0096249 A1 | 4/2014 | Dupont et al. |
| 2015/0058976 A1 | 2/2015 | Carney et al. |
| 2015/0101053 A1 | 4/2015 | Sipple |
| 2015/0128274 A1* | 5/2015 | Giokas ............... H04L 63/1425 |
| | | 726/23 |
| 2015/0254555 A1* | 9/2015 | Williams, Jr. ....... G06N 3/0454 |
| | | 706/14 |
| 2015/0264077 A1 | 9/2015 | Berger |
| 2015/0373043 A1 | 12/2015 | Wang |
| 2016/0182552 A1 | 6/2016 | Wright |

OTHER PUBLICATIONS

Non-Final Office Action, U.S. Appl. No. 14/743,875, filed Aug. 8, 2017, 14 pages.

* cited by examiner

ENTITY GROUP BEHAVIOR PROFILING

CROSS-REFERENCE TO RELATED APPLICATIONS

This application claims the benefit of U.S. Provisional Application No. 62/015,655, filed Jun. 23, 2014, which is hereby incorporated by reference.

FIELD

Embodiments of the invention relate to the field of computer security; and more specifically, to entity group behavior profiling according to one embodiment.

BACKGROUND

Over the last few years, the general populous has encountered the proliferation of malicious software (sometimes referred to as "malware") over the Internet. Malware has many forms including exploits, namely information that attempts to take advantage of a vulnerability in software that is loaded onto an electronic device in order to adversely influence or attack operations of that electronic device. Despite repeated efforts by detection systems and software patches to address software vulnerabilities, malware continues to evade and infect electronic devices worldwide.

There are several techniques known for detecting, analyzing, and responding to threats. Existing cloud-based threat intelligence collects and aggregates data from different local sensors and performs analysis on the collected data to determine if there is a threat. The result of the analysis, which is typically a blacklist of known threats (e.g., domains, files, users, etc.), may be transmitted from the cloud-based threat intelligence to the local sensors for further action. However, as advanced threats or targeted attacks become more localized (e.g., targeting certain geolocations, certain groups of people, certain industries, etc.), a cloud-based threat intelligence may not be sensitive to detect a local attack. Existing local-only threat intelligence do not typically take as input results of global intelligence which leads to many false positives.

There have been techniques for profiling the behavior of an individual entity (e.g., user, machine, service, etc.) and monitoring that entity for anomalous behavior. However, behavior profiling on an individual entity has sensitivity and accuracy problems due to the dynamic changes of that individual entity that can legitimately occur. Traditional behavior profiling and detection based on an individual entity behavior can be either too sensitive leading to false positives, or too inaccurate leading to false negatives.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
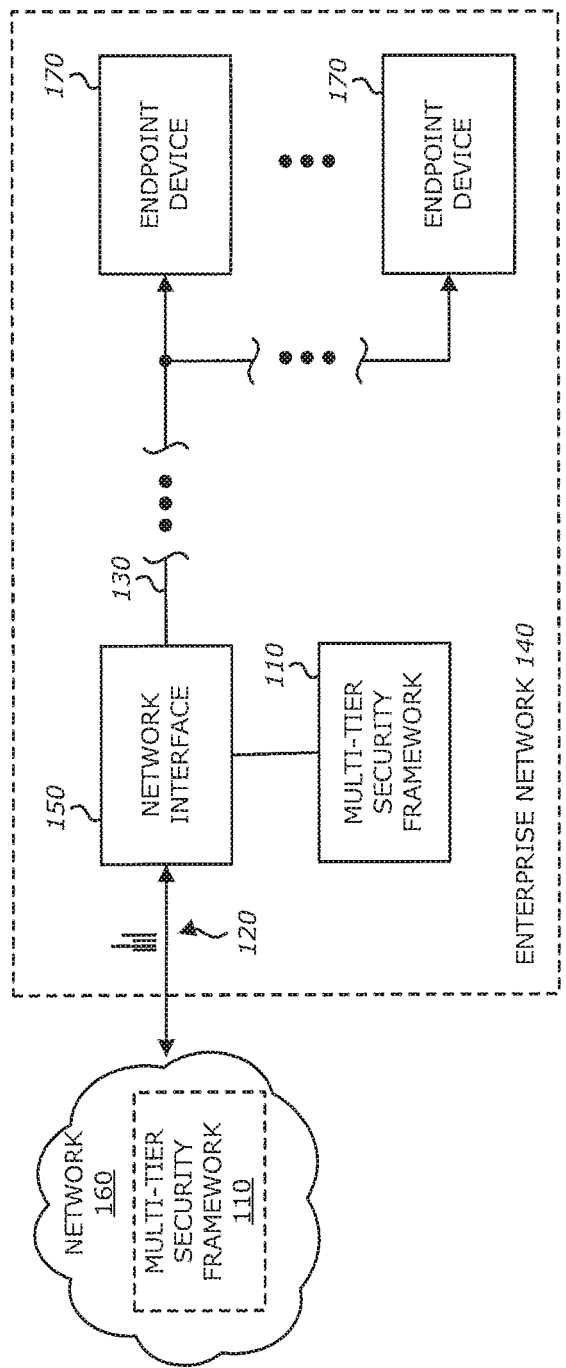
FIG. 1 illustrates a communication system deploying a multi-tier security framework according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the following description, certain terminology is used to describe features of the invention. For example, in certain situations, the terms "sensor", "logic," and "engine" are representative of hardware, firmware and/or software that is configured to perform one or more functions. For instance, as hardware, a sensor (or logic or engine) may include circuitry having data processing and/or data capturing functionality combined with data transmission and/or storage functionality. A sensor (or logic or engine) may include a processor (e.g., digital signal processor, microprocessor with one or more processor cores, a programmable gate array, a microcontroller, an application specific integrated circuit, etc.), semiconductor memory, and/or wireless or wired transmitter and/or transceiver circuitry.

Alternatively, the sensor (or logic or engine) may be software in the form of one or more software images or software modules, such as executable code in the form of an executable application, an application programming interface (API), a routine or subroutine, a script, a procedure, an applet, a servlet, source code, object code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "traffic" generally refers to one or more flows of information, where each "flow" is a series of related packets. According to one embodiment, a start of the series of related packets may include a 5-tuple that includes at least a Source address, Destination Address, and length. In transit or at rest, this series of related packets may include one of more objects, namely a subset of the related packets that collectively form either an executable that is packed or a non-executable such as a dynamically link library (DLL), a Portable Document Format (PDF) file, a JavaScript® file, Zip® file, a Flash® file, a document (for example, a Microsoft Office document, Word® document, etc.), an electronic mail (email), downloaded web page, a text message, or the like. A "packet" generally refers to any information transmitted in a prescribed format.

A "communication session" may be defined as a semi-permanent information exchange between source and destination network devices. For example, the communication session may be in accordance with protocols at the application layer (L7) (e.g., Hypertext Transfer Protocol "HTTP"), session layer (L5), or transport layer (e.g., layer 4 "L4" such as Transmission Control Protocol "TCP") of the Open Systems Interconnection (OSI) model.

The term "transmission medium" is a physical or logical communication path between two or more network devices (e.g., one of the network devices being an endpoint device with data processing and network connectivity such as, for example, a server, a mainframe; a firewall; intermediary devices such as a router, a switch or a bridge; or a client device such as a desktop or laptop computer, netbook, tablet, smart phone, set top box, wearable computing device, or a video game console). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "match" generally describes that a certain level of comparison has been successfully achieved.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

Exemplary Architectures

Referring to FIG. 1, an exemplary block diagram of a communication system 100 deploying a multi-tier security framework 110 is shown. The security framework 110 monitors and analyzes information associated with network traffic 120 that is routed over transmission medium 130 forming an enterprise network 140. According to one embodiment of the disclosure, the security framework 110 receives, processes and/or stores input information associated with communications occurring within the enterprise network 140.

As shown, the security framework 110 may be communicatively coupled with the transmission medium 130 via a network interface 150. In general, the network interface 150 operates as a data capturing device (sometimes referred to as a "tap" or "network tap") that is configured to receive information propagating to/from one or more endpoint devices 170 and provide at least some of this information to the security framework 110. For instance, the network interface 150 may provide a series of packets or certain content within the packets such as packet header fields or one or more files that are part of packet payloads. Of course, input information from the network interface 150 may be duplicative from the information originally detected during propagation to/from the targeted endpoint device 170. Alternatively, although not shown, the security framework 110 may be positioned in-line with the targeted endpoint device 170 without the network interface 150. As another alternative, the network interface 150 may be part of the security framework 110.

Herein, as an illustrative example, the input information may include information associated with one or more messages forming incoming network traffic received via a communication network 160. The communication network 160 may include a public network such as the Internet, in which case one or more security appliances, such as a firewall for example, are positioned to receive and process network traffic prior to receipt of the network traffic by logic within the security framework 110. Alternatively, the communication network 160 may be a private network such as a wireless data telecommunication network, wide area network (WAN), a type of local area network (LAN), or a combination of networks. As other illustrative examples, the input information may include log information, flow records (e.g., OSI Layer 4 "L4" information regarding communications monitored by other network devices), and host telemetry information (e.g., information from endpoint devices 170), as described below.

Although FIG. 1 illustrates the multi-tier security framework 110 within the enterprise network 140, in some embodiments the multi-tier security framework 110 is at least partially located outside the enterprise network. For example, at least some of the functions of the multi-tier security framework 110 may be performed over a different type of network (e.g., in the "cloud" over the Internet or other WAN). This is illustrated with the multi-tier security framework 110 in dashed lines in the communication network 160.

Figure 2A:
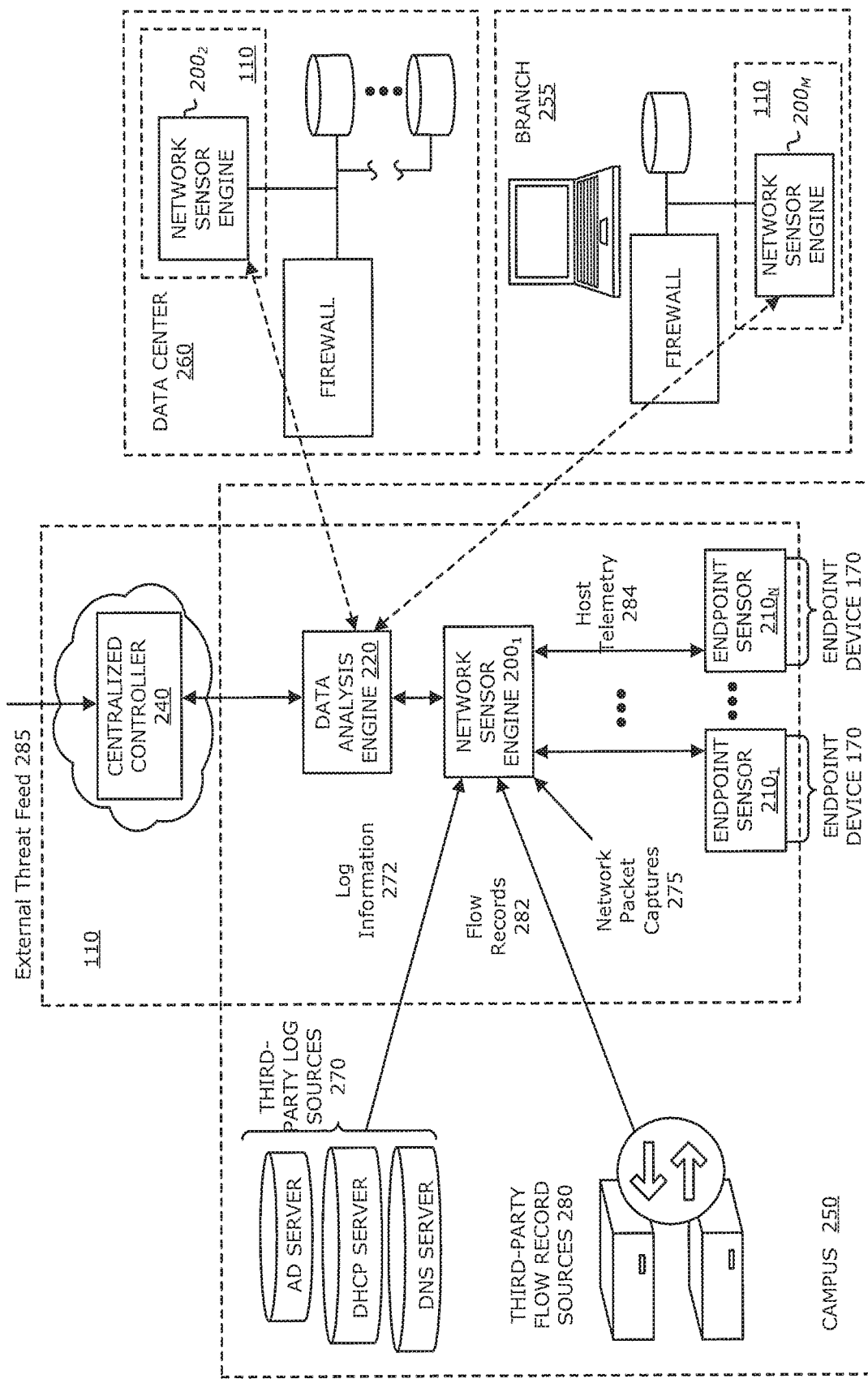
FIG. 2A illustrates the security framework of FIG. 1 according to one embodiment.
Figure 2B:
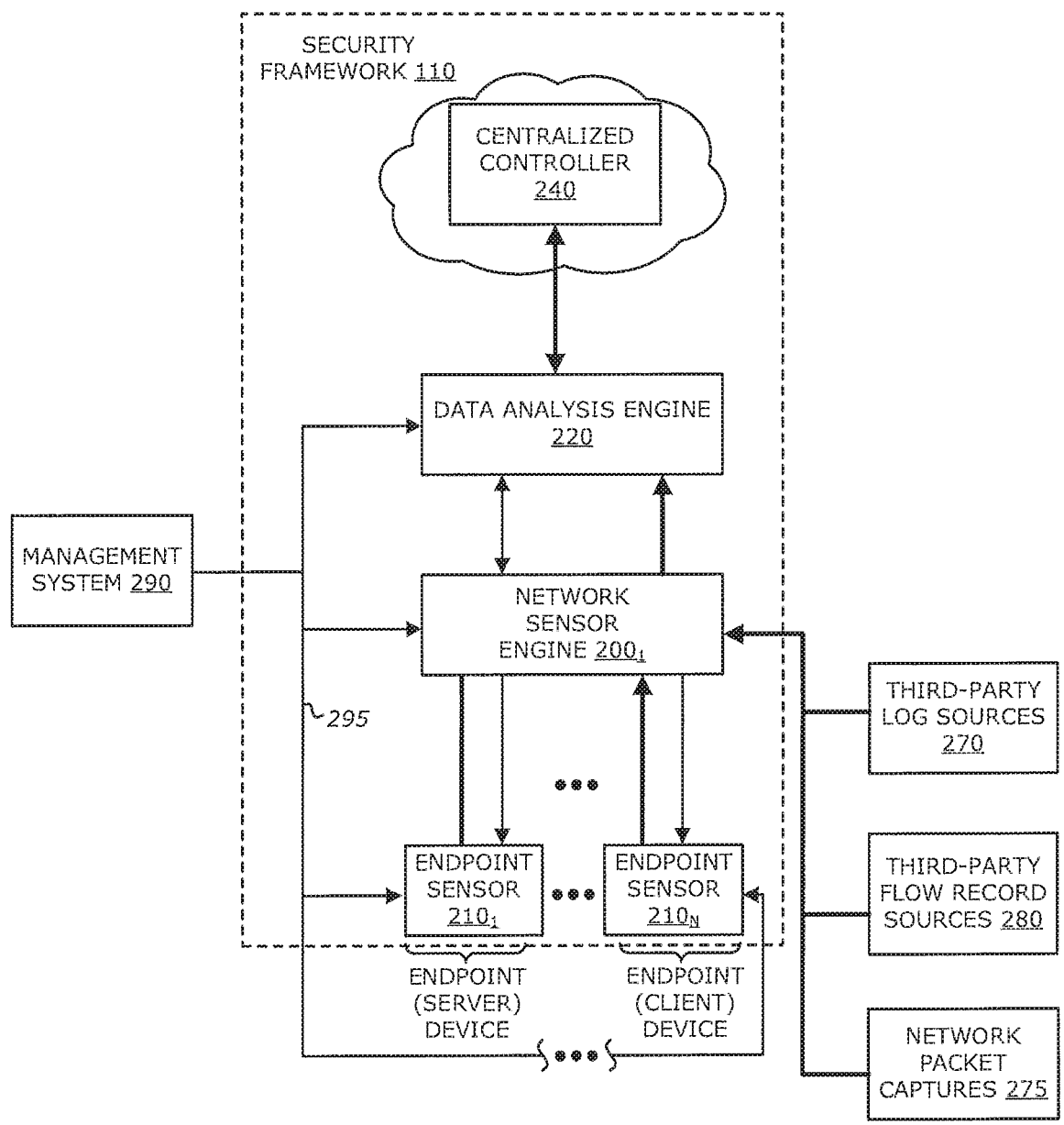
FIG. 2B illustrates the interoperability of a management system and the security framework of FIG. 1 according to one embodiment.

According to one embodiment of the disclosure, as illustrated in FIGS. 2A and 2B, the security framework 110 comprises one or more network sensor engines $200_1$-$200_M$ (M≥1), a data analysis engine 220 and a centralized controller 240. Deployed at various locations within the enterprise network 140 (e.g., campus 250, branch 255, data center 260, etc.), as shown in FIG. 2A, each of the one or more network sensor engines (also referred to as "network sensor engine(s)") $200_1$-$200_M$ may be configured to receive, process and/or store (i) information associated with monitored incoming packets that form network traffic, including extracted objects (e.g., files) (e.g., network packet captures 275 received from the network interface 150 or other devices on the network such as receipt through a SPAN port); (ii) log information from different network devices (e.g., third-party log sources 270 such as Active Directory® server logs, Domain Name System "DNS" server logs, Dynamic Host Configuration Protocol "DHCP" server logs, etc.); (iii) flow records 282 from third-party flow record sources 280; and (iv) host telemetry information 284 from one or more endpoint devices 170 (e.g. client devices and/or servers).

More specifically, the network sensor engine(s) $200_1$-$200_M$ include at least a first network sensor engine $200_1$ that is adapted to communicate with one or more endpoint sensors $210_1$-$210_N$ (N≥1), which collect and/or store information associated with the endpoint devices 170 (e.g., client devices and/or servers) that is referred to as host telemetry data. These endpoint sensor(s) $210_1$-$210_N$ may be configured as lightweight software sensors deployed on endpoint devices 170 (e.g., client devices and/or servers), where the endpoint sensor(s) $210_1$-$210_N$ are adapted to gather information associated with the endpoint devices 170 and provide such information to a particular network sensor engine (e.g., first network sensor engine $200_1$) of the network sensor engine(s) 200. For example, the gathered information of a particular endpoint device may include registry settings and/or registry changes of the endpoint device, running processes list of the endpoint device, memory usage information of the endpoint device, network connection information of the endpoint device, operating system patch level of the endpoint device, files modified since the last update, and/or disk/file system activity of the endpoint device. The gathered information may be especially useful when the endpoint devices 170 may be infected. For example, memory usage may be gathered that is associated with malicious activity, network connectivity information may be gathered that is associated with malware, disk/file system activity may be gathered that is associated with malware, etc.

There may be different endpoint sensors deployed for different devices (e.g., an endpoint sensor for a server endpoint device may be configured to gather different information than an endpoint sensor for a client endpoint device).

By way of a specific example, where the endpoint device 170 is a server, the host telemetry information may include application logs that indicate a history of applications running on the server, active network connections of the server, files modified on the server, hash of critical files of the server, information (e.g., file name, access date/time, etc.) that has been exfiltrated, or the like.

Furthermore, the first network sensor engine $200_1$ is adapted to receive network packets propagating to/from one or more devices in the network through the network interface 150 (e.g., information to/from the endpoint devices 170 or other network devices). In some embodiments the first network sensor engine $200_1$ is adapted to extract or generate metadata from the network packets. For example, in a specific embodiment, the first network sensor engine $200_1$ is adapted to perform deep packet inspection (DPI) on the packet captures to extract metadata from L2-L7 headers. For example, the first network sensor engine $200_1$ may extract headers associated with Hypertext Transfer Protocol (HTTP) messages.

Furthermore, the first network sensor engine $200_1$ is adapted to receive log information from one or more remotely located servers (e.g., Active Directory® server, DNS server, DHCP server, etc.) that may form part of the enterprise network 140 or operate in concert with network devices within the enterprise network 140. Herein, the "log information" includes information pertaining to events that have been recorded during communications between the remotely located servers and various endpoint devices. In some embodiments the first network sensor engine $200_1$ is adapted to extract and/or generate metadata from the log information 272.

As an example, the first network sensor engine $200_1$ may be adapted to receive log information from any of the third-party log sources 270 such as an Active Directory® server, which enables the first network sensor engine $200_1$ to generate a user/Internet Protocol (IP) address mapping. Since IP addresses are dynamic and may be re-assigned and the security framework is capable of storing data for a prolonged time period, the user/IP address mapping enables the first network sensor engine $200_1$ to determine a particular user (and her corresponding endpoint device) that was previously assigned a particular IP address at a certain period of time and that endpoint device may have been compromised by malware.

As other illustrative examples, the first network sensor engine $200_1$ may be adapted to receive log information 272 from a DNS server, which provides the first network sensor engine $200_1$ with DNS requests made such that a correlation can be made between the DNS requests and the users making the requests. Knowledge of the DNS requests may be important for security analysis since malware uses domain names to communicate with command and control servers (e.g., using a Domain Generation Algorithm (DGA) since static IP addresses are easy to identify and block). Also, the first network sensor engine $200_1$ may be adapted to receive log information from the DHCP server, which may be used to generate a device/IP address mapping. Combined with the user/IP address mapping, the user and device assigned to a particular IP address over the prolonged period of time may be uncovered for that IP address despite reassignment of the IP address during the prolonged period of time.

Besides log information, the first network sensor engine $200_1$ may be adapted to communicate and receive flow records 282 (e.g., netflow records, sflow records, jflow records, etc.) from third-party flow record sources 280, namely information associated with communications received and/or monitored by other networks devices within the enterprise network 140 (e.g., IP address(es), port number(s), transport type, statistics concerning the network connection, etc.). The flow records 282 allow the data analysis engine 220 (or network sensor engine $200_1$ itself) to formulate a threat exposure mapping (e.g., display of communication paths undertaken by network devices within the enterprise network 140), which may be used to detect anomalous communication patterns through deviations in normal communications by one or more of the network devices, such as an endpoint device (e.g., client device or server) for example. In some embodiments the first network sensor engine $200_1$ is adapted to extract and/or generate metadata from the flow records 282.

Besides receipt and processing of input information as described above, the first network sensor engine $200_1$ may be adapted to generate metadata in a normalized format that is readable by the data analysis engine 220. Some or all of the input information received by first network sensor engine $200_1$ is used to generate the metadata. Herein, as an optional feature, the metadata may be anonymized to remove sensitive or personalized information for the enterprise network 140. For instance, the metadata may be anonymized by substituting a user name associated with the input information being analyzed with a generic identifier. Additionally or in the alternative, the file name assigned to the input information or other properties may be substituted for corresponding generic identifiers, where these generic identifiers may be re-mapped by the first network sensor engine $200_1$ or another network device to recover the user name, file name and/or removed properties.

Normally positioned to reside within the enterprise network 140 of the particular customer, as shown in FIGS. 2A and 2B, the data analysis engine 220 is communicatively coupled to the network sensor engines $200_1$-$200_M$ and receives data from each of the network sensor engines $200_1$-$200_M$, referred to as network sensor data, that may include metadata and/or other information from the network sensor engines $200_1$-$200_M$ (e.g., raw logs, raw flow records, raw packet captures, raw host telemetry information). As an illustrative example, for HTTP traffic monitored by the network sensor engines $200_1$-$200_M$, the metadata may include, but is not limited or restricted to attributes within HTTP messages, including Host names, Referer, Uniform Resource Indicator (URI) or Uniform Resource Locator (URL), User-Agent, Mime-type, Method, Version, Cookie, Filename, Character set (Charset) or the like.

Although the data analysis engine 220 is illustrated in FIGS. 2A-2B as being deployed within the enterprise network of a particular customer, the data analysis engine 220 may be deployed in a private cloud or in a public cloud.

Herein, the data analysis engine 220 is adapted to at least (i) provide open Application Programming Interface (API) access to the stored network sensor data, (ii) conduct analytics on the network sensor data, (iii) transmit at least a portion of information it has received and/or generated to the centralized controller 240, and (iv) refine local modeling based on information received from the centralized controller 240. The analytics may be directed to conventional analytics, ad hoc analytics and predictive analytics.

Conventional analytics include established analytic techniques that are used to provide information associated with suspicious behaviors, where collectively, the suspicious behaviors may suggest malicious activity where one or more of the endpoint devices has been infected with malware. One analytical technique is Domain Generation Algorithm (DGA) detection to identify suspicious domain names that are contacted by the endpoint devices to receive updates or command.

The ad hoc analytics includes generation of a search display that enables network security personnel to conduct a keyword search to determine if a particular indicator of compromise (IOC) has already been received and processed by an endpoint device. The IOC may include contents from a particular IP address; communications with a particular domain name or IP address; download of a particular file name; a particular file hash value; or the like. Furthermore, the ad hoc analytics may generate a threat exposure mapping that outlines communications detected within the enterprise network or within a sandboxed environment that collectively identify malicious activity.

Predictive analytics comprises statistical modeling, machine learning and/or data mining for analyzing current and/or historical events in order to formulate determinations as to certain network devices, users, and/or services within an enterprise network are compromised. For instance, data analysis engine 220 may analyze how certain events along with subsequent detected events may increase or decrease the likelihood of one or more of the endpoint devices being compromised and infected with malware.

The data analysis engines of different customers are communicatively coupled to the centralized controller 240 and transmit information to the centralized controller 240. The information transmitted from the data analysis engines to the centralized controller may be less information or different information than that transmitted from the network sensor engine(s) to the data analysis engine(s). For example with respect to HTTP traffic, the information transmitted from the network sensor engine $200_1$ to the centralized controller 240 may include host names, Referer, Uniform Resource Indicator (URI) or Uniform Resource Locator (URL), User-Agent, Mime-type, Method, Version, Cookie, and/or Character set (Charset), but not the filename field. Herein, as an optional feature, the information transmitted to the centralized controller 240 may be anonymized to remove sensitive or personalized information.

Although not illustrated in FIG. 2A, it should be understood that the network sensor engines of branch 255 and data center 260 may each receive host telemetry information from endpoint sensor(s), network packet captures from packet capture device(s), third-party flow record information from third party flow record sources, and/or log information from third-party log sources.

Normally positioned outside the enterprise network 140 for communicative coupling to multiple data analysis engines associated with different customers, such as the data analysis engine 220, the centralized controller 240 facilitates automated collective intelligence by leveraging analytics from a specific customer deployment across an entire population of customers. Furthermore, the centralized controller 240 facilitates community-based collective intelligence by allowing customers to share and leverage security intelligence amongst each other. Also, the centralized controller 240 acts as an intermediary between the components of the security framework 110 and third party services such as external threat feeds 285 and enables security personnel to push threat intelligence to all customer deployments. The centralized controller 240 may be deployed in a private cloud or in a public cloud (e.g., accessed over the Internet).

The external threat feeds 285 may include blacklisted domains, blacklisted IP addresses, blacklisted filenames and/or file hashes; as well as metadata related to that blacklisted data (e.g., threat types, botnet types, first-seen timestamp, last-seen timestamp, URI, etc.). The external threat feeds 285 can be used for customer threat reporting and/or with other data when generating the global threat intelligence.

Another input to the centralized controller 240 is global metadata such as the Whois database, IP geolocation databases, and autonomous system number (ASN) databases that can be used to train data models in the global threat intelligence and improve customer knowledge in incident response.

The centralized controller 240 provides global threat intelligence that aggregates and combines different input described above to build different data analytics models to address sophisticated global threats along different dimensions including domain, IP address, user-agent, filename, etc.

Referring to FIG. 2B, in order to provide unified management of the security framework 110, a management system 290 may be communicatively coupled and provide control information 295 to the endpoint sensor(s) $210_1$-$210_N$, network sensor engines $200_1$-$200_M$, and/or data analysis engine 220. Herein, according to one embodiment of the disclosure, the management system 290 is responsible for provisioning, monitoring operability and overall management of the sensor(s) $210_1$-$210_N$, the network sensor engines $200_1$-$200_M$, and/or the data analysis engine 220. For instance, the provisioning may include conducting and managing software upgrades in order to increase the speed and case of deployment and configuration of the security framework 110. Likewise, monitoring operability may include performing, in a periodic or aperiodic manner, health checks of the endpoint sensor(s) $210_1$-$210_N$, network sensor engines $200_1$-$200_M$ and/or data analysis engine 220; collecting log information and performance data; and providing dashboards about overall health of the security framework 110.

Figure 3:
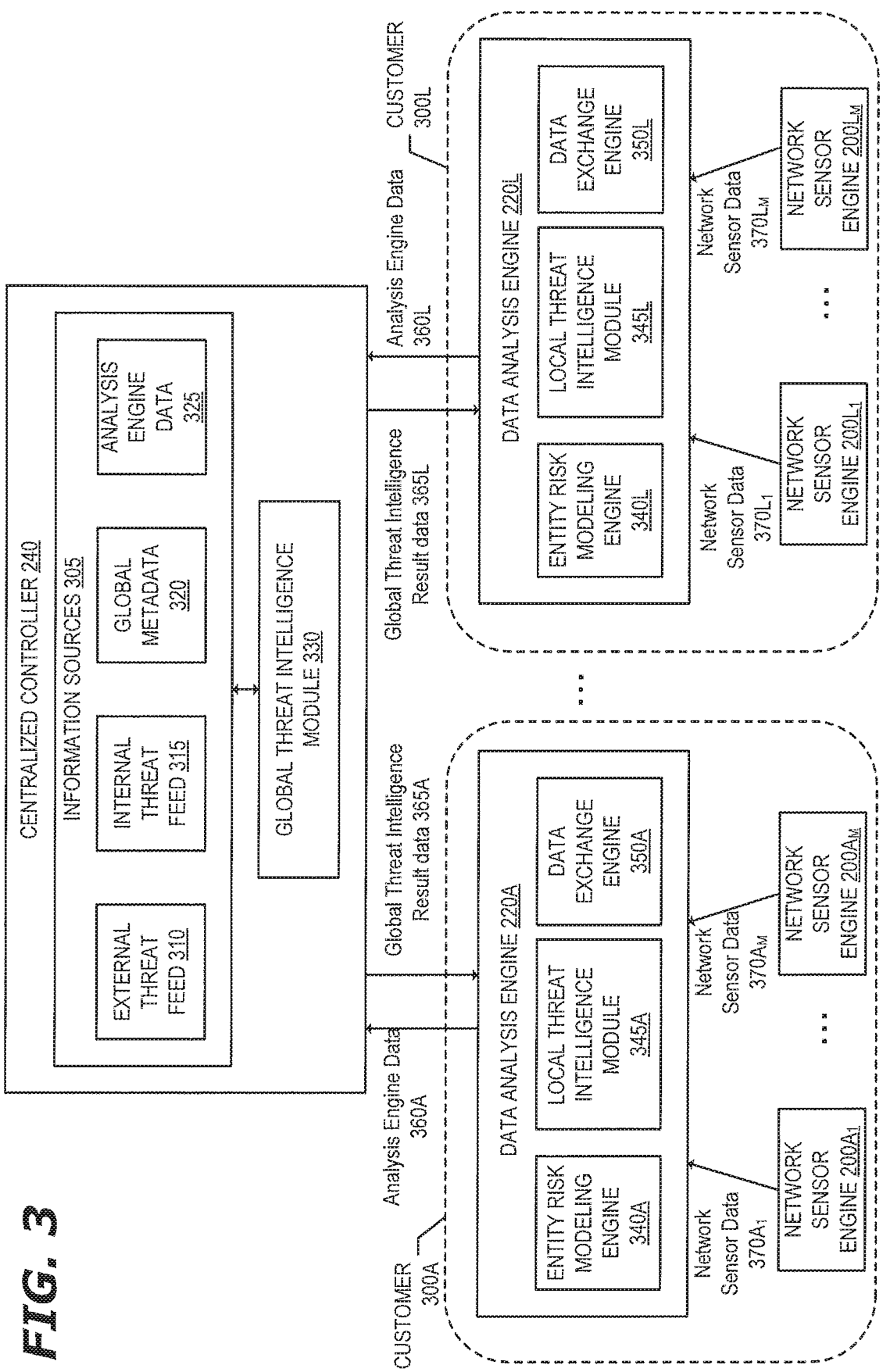
FIG. 3 illustrates more detail of the functionality of the security framework of FIG. 1 according to one embodiment.

FIG. 3 illustrates more detail of the functionality of the security framework 110 according to one embodiment. As previously described, the centralized controller 240 provides global threat intelligence for multiple customers. As illustrated in FIG. 3, the data analysis engines 220A-220L of customers 300A-300L respectively are coupled to the centralized controller 240. The data analysis engine 220A is coupled with one or more network sensor engines $200A_1$-$200A_M$ (M≥1) and the data analysis engine 220L is coupled with one or more network sensor engines $200L_1$-$200L_M$ (M≥1). The network sensor engines 200 receive/process input information and generate metadata as previously described herein. The network sensor engines $200A_1$-$200A_M$ (M≥1) transmit the network sensor data $370A_1$-$370A_M$ respectively to the data analysis engine 220A and the network sensor engines $200L_1$-$200L_M$ (M≥1) transmit the network sensor data $370L_1$-$370L_M$ respectively to the data analysis engine 220L.

The data analysis engines 220A-220L receive and store data sent from the respectively connected network sensor engine and is configured to (i) provide open Application Programming Interface (API) access to the stored network sensor data, (ii) conduct analytics on the network sensor data, (iii) transmit at least a portion of information it has received and/or generated to the centralized controller 240, and (iv) refine local modeling based on information received from the centralized controller 240. The analytics may be directed to conventional analytics, ad hoc analytics and predictive analytics as previously described. As illustrated in FIG. 3, each data analysis engine 220 includes an entity risk modeling engine 340, local threat intelligence module 345, and data exchange engine 350.

The data exchange engine 350 collects the data received from the network sensor engine(s) 200, optionally tokenizes or anonymizes the data, and transmits at least a portion of the data to the centralized controller 240 for facilitating global threat intelligence. The data transmitted to the centralized controller 240 is referred to as analysis engine data 360. The data transmitted may also include data generated by the data analysis engine such as intermediate results from the local modeling. The analysis engine data 360 may include metadata from known bad flows or users or metadata from all flows or users. The analysis engine data 360 may include derived risk modeling scores that may be attached to each flow record, which can be used for joint intelligence in the centralized controller 240. By way of a specific example, if a certain file (identified by filename or a file hash, for example) is commonly downloaded by a user with a high risk score from different data analysis engines, the centralized controller 240 may determine that the file may be directly related with certain attacks or threats even before there is proof that there has been an attack or threat.

The local threat intelligence module 345 receives and caches information from the centralized controller 240 and also manages refining local threat intelligence based on the data received from the centralized controller 240 and network sensor engines 200. For example, the data analysis engine 220A may include a number of machine learning models that are trained using data received from the network sensor engines $200A_1$-$200A_M$ and/or using data derived from the data received from the network sensor engines $200A_1$-$200A_M$ locally (these models are sometimes referred herein as "local models"). The local threat intelligence module 345 may periodically and repeatedly cause these local models to be retrained or adapted using the global threat intelligence result data 365 received from the centralized controller 240, which may itself be adapted using the local intelligence data. The result data 365 received from the centralized controller 240 may include not only the results of training one or more global models (a global model is a machine learning model that is trained using data received from the different data analysis engines 220 of different customers along with other external and internal data) such as a blacklist of known threats (e.g., domains, IP addresses, filenames, file hashes, etc.), but also information of the modeling itself to refine or adapt the local models based on the training results of the global models. For example, the information received from the centralized controller 240 to refine a local model may include information specifying a feature modification for the local model (e.g., removing or adding features), intermediate results of training a global model such as probability score associated with the feature(s) of the local model, and/or a modification to the algorithm of the local model.

The entity risk modeling engine 340 models and monitors the risk of threats for each individual user of the customer for a certain duration of time (which potentially can be essentially unlimited). For example, the entity risk modeling engine 340A models and monitors the risk of threats for users of the customer 300A and the entity risk modeling engine 340L models and monitors the risk of threats for users of the customer 300L. The entity risk modeling engine 340 may take as inputs (1) prior threats as indicated from the centralized controller 240 (e.g., transmitted in the result data 365 that may be stored in cache on the data analysis engine 220A) and/or refined local threat intelligence (e.g., received from the local threat intelligence module 345) and/or (2) risks associated with user behavior changes. An example of a prior threat input is when a user has an HTTP flow record to a certain domain A resolved to an IP address B with user-agent C that downloads a filename D, the risk of that HTTP flow can be computed by aggregating the prior risk probability of each of those attributes (Domain A, IP address B, user-agent C, and filename D), where the prior risk probability is queried from the global threat intelligence (either the cached version stored on the data analysis engine 220 or from the centralized controller 240). Risks associated with user behavior changes may be determined through analysis of past behavior compared to current behavior. For example, for a particular user, all domains, port numbers, IP addresses, destination countries, etc., that the user accessed during a certain period of time are stored and the behavior of traffic of that user to any new domain, IP address, destination countries that the user has never been before is monitored. Based on this data, a user-behavior based risk score may be generated. A profile of the distribution and/or aggregated counts of certain user behavior such as DNS queries, internal file downloads, server logins, etc. may be performed and any suspicious behavior changes may be monitored for (e.g., increased number of file downloads, failed logins, etc.) and used when generating the user-behavior based risk score. In one embodiment, the entity risk modeling engine 340 uses exponential decay pulse to model the time-dependent risk of a single user that has the form of $A*\text{Exp}[-(T-T_0)/B]$, where $T_0$ is the event time, A is amplitude, and B is the relaxation time for the event; where each event is a threat event (e.g., a DGA threat event, a threat feed hit, an NXDOMAIN event, a request surge event, an abnormal request event, etc.), each of which has its own defined severity (encoded in amplitude) and relaxation time (how long the event stays in effect). In one embodiment, the events are aggregated when assigning a risk score for the user.

There may be many different behaviors monitored and modeled for threat analysis. Example user behavior actions include: access patterns to internal services and/or devices; access patterns to servers with high-level access controls; access patterns of external Internet destination; the applications used by the user, and normal working hours for the user. Example client device behavior actions include: software updates installed on the client device; firewall status of the client device (e.g., whether a firewall is enabled or disabled); anti-virus software status of the client device (e.g., whether anti-virus software is enabled or disabled); access patterns to other network devices using administrator or other credentials; traffic patterns such as DNS traffic, SMTP traffic, HTTP traffic; beaconing traffic patterns; covert communication—using standard/known channels to communicate with external entities for command and control; and traffic patterns based on destination country. Example server behavior actions include: services offered by the server, user/group login patterns and deviations from such patterns; amount of data downloaded from specific client device or user, and access patterns of files stored on the server.

The centralized controller 240 includes a global intelligence module 330 that is configured for automated collective intelligence by leveraging analytics from a specific customer deployment across an entire population of customers and allows sharing and leverage of security intelligence amongst multiple customers. For example, the centralized controller 240 is configured to aggregate and combine different input to build different data analytics models to address sophisticated global threats along different dimensions including domain, IP address, user-agent, filename, etc.

The global intelligence module 330 takes one or more information sources 305 as inputs including one or more external threat feeds 310, internal threat feeds 315, global metadata 320, and analysis engine data 325.

The external threat feeds 310 may include blacklisted domains, blacklisted IP addresses, blacklisted filenames and/or file hashes; as well as metadata related to that blacklisted data (e.g., threat types, botnet types, first-seen timestamp, last-seen timestamp, URI, etc.). The external threat feeds 310 could also be collected through a partnership with a government organization (e.g., an intelligence organization) or other public threat reports. The external threat feeds 310 can be used for customer threat reporting and/or with other data when generating the global threat intelligence. The internal threat feeds 315 may include threat information generated by the security framework 110 through internal investigation and research. The internal threat feeds 315 can be used for customer threat reporting and/or with other data when training data models in the centralized controller 240 and/or data analysis engines 220A-L.

The global metadata 320 may include information received from the Whois database, IP geolocation databases, and autonomous system number (ASN) databases that can be used to train data models in the global threat intelligence and improve customer knowledge in incident response. Whois information contains domain registration information such as name, location, email address, company of both the registrar and registrant, name server at registration time, etc. The whois information includes not only the domains seen by users but all registered domains for certain top level domains. This information can be used to track the correlation over different domains and to identify unknown bad domains from ownership correlation analysis.

The analysis engine data 325 includes the telemetry information received from the data analysis engines 220A-L. The telemetry information received from the data analysis engines 220A-L may be less and/or different information than the data analysis engines 220A-L received from the network sensor engines 200A-L. For example, in the case of HTTP traffic, the analysis engine data 325 may include host names, Referer, Uniform Resource Indicator (URI) or Uniform Resource locator (URL), User-Agent, Mime-type, Method, Version, Cookie, and/or Character set (Charset), but not the filename field. The analysis engine data 325 may also include results of local models trained on the data analysis engines 220. For example, the analysis engine data 325 may include entity risk data that indicates a probability that a certain entity is compromised, which is generated by the entity risk modeling engine 340 of the data analysis engines 220.

The global threat intelligence module 330 provides global threat intelligence that aggregates and combines different input described above to build different data analytics models to address sophisticated global threats along different dimensions including domain, IP address, user-agent, filename, etc.

In one embodiment, a domain/host global intelligence corpus (referred to as a domain corpus) is generated by the global threat intelligence module 330 that includes different aspects of information for a particular domain. By way of example, to the domain corpus, the following information is collected by the centralized controller: (1) whois information (from the global metadata source 320); (2) virus/malware threat information and/or other emerging threat information (from the external threat feed source 310 and/or internal threat feed source 315) (3) customer traffic (from the analysis engine data source 325); (4) DNS traffic (from the analysis engine data source 325 or other DNS traffic sources); and 5) entity risk data (from the analysis engine data source 325).

Whois information contains domain registration information such as name, location, email address, company of both the registar and registrant, name server at registration time, etc. as previously described herein.

The virus/malware threat information includes virus/malware information found for a particular domain (e.g., all URLs from the domain that have been found to host malware/virus, malware/virus type, first-time seen timestamp for the malware/virus, last-time seen timestamp for the malware/virus, etc.). This information can be used to track the history of a certain domain to determine a likelihood of it being compromised and/or when it has been compromised. The emerging threat information provides different threat information of a certain domain (e.g., whether the domain is malicious; the type of threats posed by the domain, the URIs of threats, first-time seen timestamp for each threat, last-time seen timestamp for each threat, etc.).

Customer traffic is aggregated across all real-world access information to a certain domain from different customers and includes information such as URI, user-agent, filename, file hash, etc. This information may be used to track the background traffic to each domain to avoid potential false positives and also to detect certain domain anomalous behavior (e.g., some parked domains are suddenly used for command-and-control (C&C) communications). As an example of avoiding a false positive, if a third party threat feed indicates that there is a URI of a domain associated with malware, a determination of how much total customer traffic is going to that domain globally is observed to avoid deeming the entire domain as a threat.

DNS traffic provides a mapping of IP addresses to domains when an IP address is queried and resolved from a real customer visit, and also other real-time domain information such as time-to-live (TTL) values, name servers, or other DNS information. The DNS traffic information may be used to track an IP address as it moves domains (e.g., to detect fast flux that may be used by botnets in an attempt to hide phishing or malware sites), track the short-lived domains, track compromised name servers, track poison name servers, etc.

Entity risk data includes derived risk information when a user access a certain domain that may be used to detect malicious activity that may be "hidden." For example, some central attacking hosts do not host any malicious content directly but participate in malicious activity by redirecting visits to different malware content hosting sites based on traffic access patterns (e.g., based on user-agent, referrer). These types of users will be associated as high risk users such that the central attacking hosts are detected, even if there is no malicious content directly hosted on them, and all further redirects may be blocked from them.

The global intelligence module 330 and each local threat intelligence module 345 are operable to cooperate to perform adaptive threat modeling between global and local threat intelligence. For example, a local threat intelligence module 345 may adapt/refine training of one or more local models based on a result of one or more global models being trained on the global intelligence module 330. For example, the local threat intelligence module 345 may adapt local model(s) by modifying feature(s) of the local model(s) (e.g., adding features, removing features, and/or prioritizing features), updating input to the local model(s) based on the result of the global model(s), and/or modifying the algorithm of the local model(s) based on the result of the global model(s). The local threat intelligence module 345 may adapt the result of the global model(s) received from the global threat intelligence module 330 using data local to the data analysis engine 220.

As previously described, in some embodiments the data analysis engine 220 maintains a cache of information received from the centralized controller 240 (global intelligence) that is used when training the local model(s). In one embodiment, the centralized controller 240 selectively transmits data to the data analysis engine 220 to be cached based on a determination of what information would be most relevant for the data analysis engine 220. As an example, the centralized controller 240 may have probability risk scores for destination IP addresses that are geolocated across the world but the data analysis engine 220 may analyze traffic propagating to/from IP address that are geolocated in only a certain group of countries. In such a case, the centralized controller 240 may transmit only the probability risk scores for destination IP addresses to a particular data analysis engine 220 for which that data analysis engine 220 is most likely to encounter in its local data. The centralized controller 240 determines what data to selectively transmit to a particular data analysis engine 220 based at least on an analysis of the data received from that particular data analysis engine 220.

Figure 4:
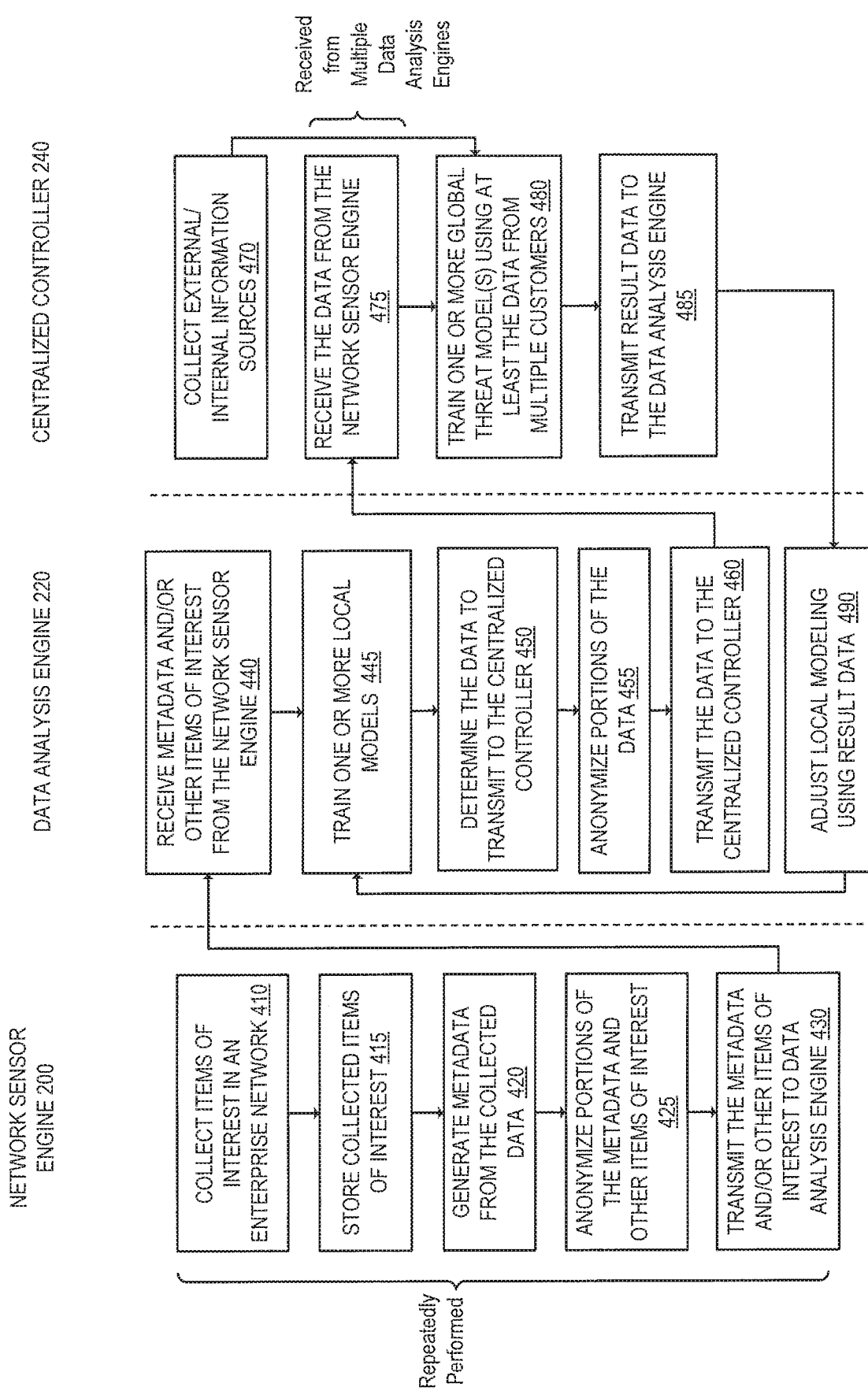
FIG. 4 is a flow diagram that illustrates exemplary operations performed in the security framework for collaborative and adaptive threat intelligence according to one embodiment.

FIG. 4 is a flow diagram that illustrates exemplary operations performed in the security framework 110 for collaborative and adaptive threat intelligence according to one embodiment. The operations of FIG. 4 will be described with reference to the exemplary embodiment of FIG. 3. However, it should be understood that the operations of FIG. 4 can be performed by embodiments other than those described with reference to FIG. 3, and the embodiments discussed with reference to FIG. 3 can perform operations different than those described with respect to FIG. 4. For example, the operations of FIG. 4 may not be performed in the same exemplary architecture as described in FIG. 3.

The operations begin at operation 410 with the network sensor engine 200 collecting items of interest in an enterprise network. The items of interest may be collected from multiple disparate sources including one or more of: network packet captures, third party log sources, flow based collection records, and host telemetry information as previously described herein. Flow then moves to operation 415 in which the network sensor engine 420 stores the collected items of interest.

Flow then moves to operation 420 where the network sensor engine 200 generates metadata from at least a portion of the collected data. For example, the network sensor engine 200 may extract metadata from different data such as extracting data from packet headers, extracting data from logs, extracting information from flow based collection records, and/or extracting information from host telemetry information. As a specific example, the network sensor engine 200 may perform deep packet inspection on the network packet captures to extract metadata from L2-L7 headers (e.g., the network sensor engine 200 may extract information from certain HTTP headers (e.g., Host names, Referer, Uniform Resource Indicator (URI) or Uniform Resource Locator (URL), User-Agent, Mime-type, Method, Version, Cookie, Filename, Character set (Charset) or the like)). The network sensor engine 200 may derive metadata from at least a portion of the collected data. For example, the network sensor engine 200 may calculate a payload size of packets. Flow then moves to operation 425.

At operation 425, which is optional in some embodiments, the network sensor engine 200 anonymizes portions of the generated metadata and other collected items of interest prior to transmission to the data analysis engine 220 to remove or obfuscate sensitive or personalized information of the customer network. By way of example, example attributes that may be anonymized include a username/user identifier, IP address, home address, social security number, credit card number, email address, and name. There may be different ways of anonymizing the data in different embodiments and may be based on a policy installed on the network sensor engine 200. In one embodiment, the data to be anonymized is removed from the data. In another embodiment, the network sensor engine 200 uses an invertible function to anonymize the data. In yet another embodiment, the network sensor engine 200 uses a one-way hash function to anonymize the data. Flow moves to operation 430.

At operation 430, the network sensor engine 200 transmits at least a portion of the metadata and/or other items of interest to the data analysis engine 220. This data is referred to as network sensor data. The metadata and/or other items of interest of the network sensor data may include anonymized information as described above. The operations 410-430 are performed by the network sensor engine 200 repeatedly in some embodiments.

The data analysis engine 220 receives the network sensor data (the metadata and/or the other items of interest) from the network sensor engine 200 at operation 440. It should be understood that the data analysis engine 220 may receive network sensor data from multiple network sensor engines and the data may be repeatedly and periodically received.

Next, at operation 445, the data analysis engine 220 trains one or more local models using at least the received metadata and/or other items of interest. The local model(s) may also take as input global intelligence received from the centralized controller 240 (e.g., either the cached version on the data analysis engine or a result of querying the centralized controller 240). The one or local models that are trained may be based on one or more global models on the centralized controller 240. For example, in a specific embodiment, the one more local models are the same as one or more global models trained on the centralized controller 240 (trained with different information since the centralized controller 240 has access to data from multiple data analysis engines from multiple customers). The results of training the local model(s) may be displayed in a user interface such as a dashboard for the customer. The data analysis engine 220 may also support interactive customer queries over the stored data including the results of training the local model(s). Example local models that may be trained include: a local model for destination IP address, a local model for destination domains, a local model for filenames or file hashes, a local model for entity risk, etc. As will be described in greater detail later herein, the data analysis engine 220 is operable to adapt one or more of the local models and/or input(s) into the local models based on results of training the global model(s) on the centralized controller 240 and local analyzer data. Flow moves from operation 445 to operation 450.

As a specific example, an entity risk model may be one of the local models that may be trained. For example, the entity risk modeling engine 340 is configured to model and monitor the risk of threats for individual entities of the respective customer 300 for a certain duration of time. Risks associated with entity behavior changes may be determined through analysis of past behavior compared to current behavior. For example, for a particular entity, all domains, port numbers, IP addresses, destination countries, etc., that the entity accessed during a certain period of time are stored and the behavior of traffic of that user to any new domain, IP address, destination countries that the entity has never been before is monitored. Based on this data, an entity-behavior based risk score may be generated. A profile of the distribution and/or aggregated counts of certain user behavior such as DNS queries, internal file downloads, server logins, etc. may be performed and any suspicious behavior changes may be monitored for (e.g., increased number of file downloads, failed logins, etc.) and used when generating the entity-behavior based risk score.

Figure 5:
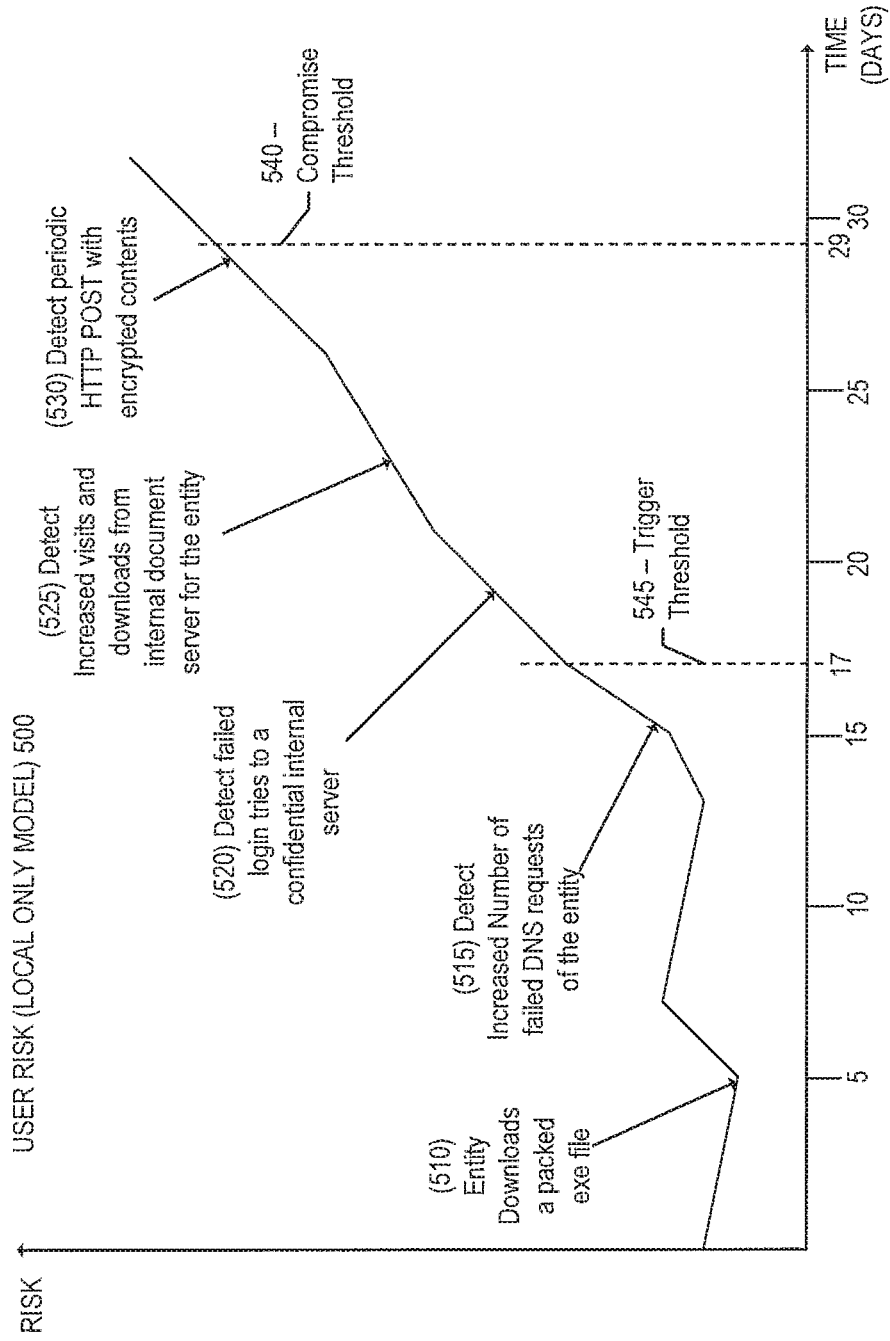
FIG. 5 illustrates a conceptual example of an entity risk model that takes as input only data that is known locally to the data analysis engine according to one embodiment.

FIG. 5 illustrates a conceptual example of an entity risk model 500 that takes as input only data that is known locally to the data analysis engine 220 according to one embodiment. In this example, many of the signals indicate behavior that has been determined to be potentially abnormal as compared with historical entity behavior profile. Determining "abnormal" behavior may include generating a baseline of entity activity by profiling historical behavior for a certain period of time and using that baseline to identify any behavior changes that may be suspicious. Example dimensions that may be profiled for the entity include: visited domains; destination IP addresses seen in packets of the entity; countries of the destination IP addresses, source ports of packets of the entities; applications used by the entity; etc. It should be understood that these are examples of dimensions that may be profiled for entities and there may be different or additional dimensions profiled. Each dimension profiled can take as input one or more features. For example, with respect to the visited domain dimension, there may be a number of features as input such as the total number of visited domains, the frequency distribution of visited domains, time range of each visited domain, etc.

At event 510, a packed executable file is detected as being downloaded by an entity. Downloading a packed executable file may or may not be indicative of suspicious activity as indicated by the relatively low risk on the graph. At event 515, the entity has been detected as having an increased number of failed DNS requests 515. The increased number of failed DNS request is based on the historical failed DNS request counts (e.g., total counts, average counts, frequency, time window, etc.) for the entity over a certain period of time (e.g., day, week, month) that is used as a baseline to identify any sudden behavior changes of failed DNS requests (e.g., ten times greater the number of DNS requests in one hour) that is then translated to a risk probability. The combination of the entity downloading a packed file and the increased number of failed DNS requests increases the risk probability for the entity. At event 520, the entity has been detected as having submitted a failed login to a confidential internal server, which increases the risk probability for the entity. At event 525, the entity is detected as having increased visits and downloads from an internal document server (as compared to the historic average of the entity visiting and downloading from that internal document server), which increases the risk probability for the entity. Finally, at event 530, the entity is detected as transmitting periodic HTTP POST with encrypted contents to a server.

Referring back to FIG. 4, at operation 450 the data analysis engine 220 determines the data to transmit to the centralized controller 240. In one embodiment, the data analysis engine 220 limits the data sent to the centralized controller 240 to save bandwidth and processing resources. In one embodiment, the data analysis engine 220 determines the amount of data to transmit based on the results of training the local model(s) in operation 445. For example, for each local model being trained, the data analysis engine 220 may sort the data according to probability for that local model and send only a certain percentage of the highest probability data to the centralized controller (e.g., the top ten percent of data that it deems most suspicious according to the local model). In another embodiment, the data analysis engine 220 takes a random sampling of data (e.g., ten percent of data) and will transmit only that data to the centralized controller 240.

In yet another embodiment, if the data analysis engine 220 determines that an entity is compromised or is likely compromised (e.g., the user is compromised, a device is compromised, etc.), the data analysis engine 220 transmits a predefined amount of data to the centralized controller related to the compromised entity. For example, a result of training an entity risk model for a particular entity (e.g., a user risk model for a particular user) may be that the resulting entity risk score exceeds a certain compromise threshold, which is an indication that the entity has been compromised. A compromised entity may perform malicious actions resulting from the compromise (e.g., downloading unauthorized files, attempting to login to secure servers, uploading information to servers, attempting to compromise other entities, etc.). Typically an entity that is compromised has been for some time prior to the indicator of compromise threshold being exceeded. Thus, a compromised entity may have been performing malicious actions for some period of time prior to a determination that the entity has been compromised. As a result, the data analysis engine 220 accesses data related to the entity for a certain period prior to a time in which the entity risk score exceeded the compromise threshold. However, based only on local information, the data analysis engine 220 may not be able to determine whether a certain activity was suspicious or legitimate. Therefore the data analysis engine 220 may transmit data besides an indication of a compromised entity to the centralized controller 240 for further analysis and modeling. After determining that an indicator of compromise threshold has been exceeded for an entity, the data analysis engine 220 accesses a certain amount of data related to the entity. The amount of data related to the entity that is accessed may be different in different embodiments. For example, in one embodiment, the amount of data is predefined (e.g., all data related to the entity in the month prior to the time associated with the indicator of compromise being exceeded). In another embodiment, the amount of data is dependent on the results of the entity risk model. For example, the data analysis engine 220 may access all of the data related to the entity that occurred at a point after a trigger threshold is exceeded (the trigger threshold is lower than the compromise threshold). For example, with respect to FIG. 5, the compromise threshold 540 is higher on the risk score than the trigger threshold 545, and all of the data related to the entity occurring after the trigger threshold 545 has been exceeded (e.g., all data after 17 days in the example illustrated in FIG. 5) is selected for transmission to the centralized controller 240.

Referring back to FIG. 4, flow moves from operation 450 to operation 455, which is optional in some embodiments, where the data analysis engine 220 anonymizes portions of the data that will be transmitted to the centralized controller 240. The anonymization may be performed similarly as described with respect to operation 425. Flow then moves to operation 460 where the data analysis engine 220 transmits the data to the centralized controller 240. With respect to FIG. 3, this information is referred to as analysis engine data 360.

The centralized controller 240 receives the data from the network sensor engine 220 at operation 475. For example with respect to FIG. 3, the analysis engine data received from the data analysis engine 220 is stored as analysis engine data 325. It should be understood that the centralized controller 240 receives data from multiple network sensor engines from multiple customers.

Flow moves from operation 475 to operation 480 where the centralized controller 240 trains one or more global models using at least the data received from the data analysis engines of multiple customers. An example of a global model includes a combination of features that are included in multiple local models. As a specific example, if there is a local model for IP address, a local model for domains, and a local model for filenames, there may be a global model that combines the IP address, domain, and filename feature in a graph model and results may be correlated across different dimensions. Training of the global model(s) may also take as input one or more internal and/or external sources such as external threat feed 310, internal threat feed 315, and/or global metadata 320, which are collected at operation 470, and/or other internal sources such as internal threat feeds 315. For example, the global threat intelligence module 330 may aggregate and combine the different input (e.g., the data received from the data analysis engines, external threat feed data, global metadata, and/or internal threat feeds) to train different models along multiple dimensions. By way of a specific example, the global threat intelligence module 330 may maintain and create a domain corpus as previously described herein.

Flow moves from operation 480 to operation 485 where the centralized controller 240 transmits result data of training of the global model(s) to the data analysis engine 220. The result data may include not only the results of training the global model(s) (e.g., a blacklist of known threats) but also information of the modeling itself so that the data analysis engine 220 can refine or adapt the local modeling. For example, the information received from the centralized controller 240 to refine a local model may include information specifying a feature modification for the local model (e.g., removing features, prioritizing certain features, and/or adding features), intermediate results of training a global model such as a risk probability score associated with the feature(s) of the local model, and/or a modification to the algorithm of the local model. Each feature is a property or dimension that is being observed. Example features include destination IP address; countries of destination IP address; domains accessed; DNS queries; internal file downloads; server logins; duration of time that a user is using their machine or using the network; what machines the user normally authenticates with; what applications the user typically uses (which may also include a time component such as what applications the user typically uses in the morning, etc.); what machines the user normally sends/receives traffic to/from; and what types of files are normally downloaded by the user.

The information received from the centralized controller 240 may depend on the local model(s) trained on the data analysis engine 220 and the global model(s) trained on the centralized controller 240. For example, if a local model and a global model are the same (with a difference that the centralized controller 240 has access to different data than the local model), the result data transmitted to the data analysis engine 220 may include information related to a feature modification (e.g., reduction, prioritization, and/or addition of features). As another example, if a local model and a global model are not the same (e.g., the global model is trained with different features than the local model), the result data transmitted to the data analysis engine 220 may include intermediate results of the feature(s) of the local model and potentially a feature modification.

The data analysis engine 220 receives the transmitted result data from the centralized controller 240 and at operation 490 adjusts the local modeling using the result data such as adapting one or more local model(s) and/or input(s) into the local model(s) using the transmitted result data. For example, in the case of a feature modification of a local model (e.g., remove, prioritize, or add feature(s), the data analysis engine 220 modifies that local model accordingly. In the case of an intermediate result (e.g., a threat probability score), the data analysis engine 220 may use that intermediate result as an input to the local model(s) or modify that intermediate result based on the analysis engine data prior to using it as input to the local model(s) to adapt the intermediate result to the local intelligence. For example, if the intermediate results from the centralized controller 240 indicate that an IP address has a 30% probability threat score, the data analysis engine 220 may adjust the probability threat score based on its local intelligence to reflect the threat of that IP address experienced by that particular data analysis engine. For example, if the data analysis engine 220A does not have data that indicates that traffic has been destined to the IP address, the data analysis engine 220A may modify the probability threat score to increase the score. As another example, if the data analysis engine 220A has data that indicates that traffic is commonly sent to that IP address, the data analysis engine 220A may lower the probability threat score. Refining and/or adapting the local models increases sensitivity and convergence. Flow then moves back to operation 445 where the local models are again trained.

Figure 6:
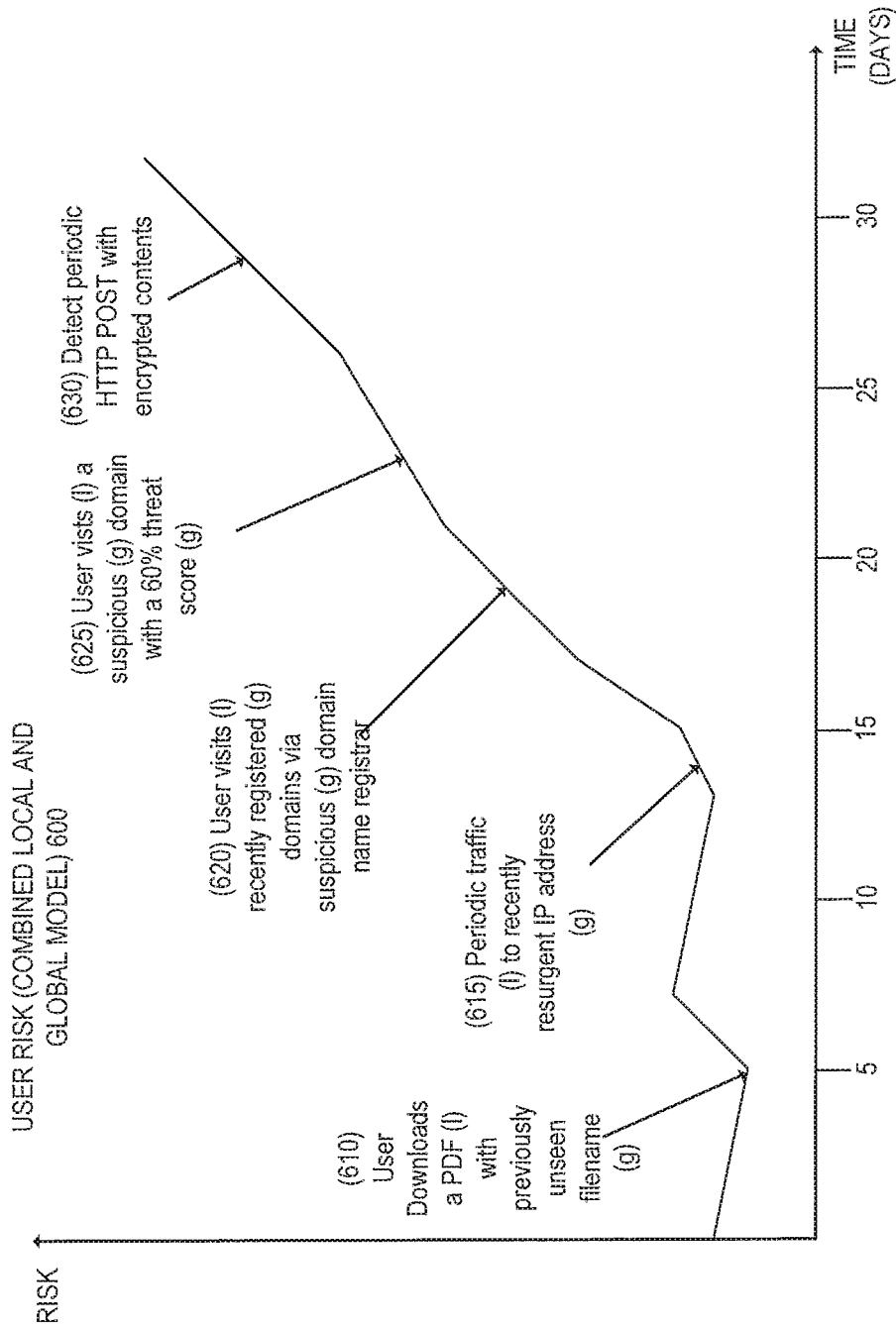
FIG. 6 illustrates a conceptual example of an entity risk model that takes as input local data (data known locally to the data analysis engine) and global data maintained by the centralized controller according to one embodiment.

FIG. 6 illustrates a conceptual example of an entity risk model 600 that takes as input local data (data known locally to the data analysis engine 220) and global data maintained by the centralized controller 240 according to one embodiment. For example, the global data is generated and updated by the centralized controller 240 and the local data is generated by local user behavior modeling. At event 610, the data analysis engine 220 detects a PDF with an unseen filename as being downloaded by a user (a file with that filename has not been downloaded before). The data analysis engine 220 receives the information that the filename is unseen from the centralized controller 240. For example, the centralized controller 240 may maintain the history of filenames of files (received from the different data analysis engines) that have been downloaded by users of different customers (e.g., filename, number of downloads, average number of downloads, first-seen timestamp, last-seen timestamp, entity risk scores when downloading the file, etc.). The data analysis engine 220 can query the centralized controller 240 for the filename information to determine whether it is unseen and/or access a local cache of the global intelligence stored on the data analysis engine for the filename information.

At event 615, the data analysis engine 220 detects that the user transmitted periodic traffic to a recently resurgent IP address, where the information that indicates that the IP address is recently resurgent is received from the centralized controller 240. A recently resurgent destination IP address occurs when an IP address has received a sudden increase of visits, which may be found via a high standard deviation of visits. The centralized controller 240 may maintain a history of destination IP address information collected from the different data analysis engines (e.g., total number of visits to a particular destination IP address, average number of visits to a particular destination IP address over a certain time period, a standard deviation number of visits to a particular destination IP address, first-seen timestamp of a visit to a particular destination IP address, last-seen timestamp of a visit to a particular destination IP address, number of unique visitors to the to a particular destination IP address, etc.). The data analysis engine 220 can query the centralized controller 240 for the destination IP information and/or access a local cache of the global intelligence stored on the data analysis engine for the destination IP information to determine whether the destination IP address is recently resurgent.

At event 620, the data analysis engine 220 detects a visit from the user to a recently registered domain that was registered with a suspicious registrar, where information indicating that the domain is recently registered and that the registrar used for the registration is suspicious is received from the centralized controller 240. The centralized controller 240 may maintain whois information (e.g., part of the global metadata 320) that contains domain registration information such as name, location, email address, company of both the registrar and registrant, name server at the time of registration, etc. The centralized controller 240 may also maintain a global registrar reputation system by correlating the domain registration information of different domains that have been determined to be suspicious (e.g., as reported through an external threat feed or through internal analysis) to determine a likelihood of whether a certain domain registrar is suspicious (e.g., is relatively used more often for registering malicious domains than other registrars). The data analysis engine 220 can query the centralized controller 240 for the domain information and/or access a local cache of the global intelligence stored on the data analysis engine for the domain information to determine that a user visit is to a recently registered domain that was registered with a suspicious domain name registrar.

At event 625, the data analysis engine 220 detects that the user visits a suspicious domain that has a 60% probability threat score, where the probability threat score information is received from the centralized controller 240. The centralized controller 240 may maintain a domain corpus that includes different aspects of information for a particular domain such as: domain registration information for the domain (e.g., obtained from a whois database and includes information such as name, location, email, registrar company, registrant company, name server at registration time, etc.); external and/or internal threat information for the domain (e.g., information specifying virus/malware information found for the domain such as all URLs from the domain that have been found to host malware/virus, malware/virus type, first-time seen timestamp for the malware/virus, last-time seen timestamp for the malware/virus, etc.); DNS traffic information of the domain (e.g., information that provides a mapping of IP addresses to domains when an IP address is queried and resolved from a real customer visit, and also other real-time domain information such as time-to-live (TTL) values, name servers, or other DNS information); telemetry traffic information of the domain (e.g., an aggregation of the access information to the domain from different customers (as reported by the different data analysis engines) such as URI, user-agent, filename, file hash, etc.); and/or entity risk data that includes derived risk information when an entity access a certain domain. Using the domain corpus, the centralized controller 240 may run graph analytics modeling such as belief propagation or page rank to assign a risk score to each domain in the domain corpus, which is periodically and repeatedly updated as new data is collected. The data analysis engine 220 can query the centralized controller 240 for the domain risk score and/or access a local cache of the global intelligence stored on the data analysis engine for the domain risk score. At event 630, the data analysis engine 220 detects that the user has periodically transmitted HTTP POST messages with encrypted contents.

In one embodiment, collaborative and adaptive threat intelligence is performed in order to improve Domain Generation Algorithm (DGA) detection. A DGA is an algorithm dynamically generates domain names that correspond to command-and-control (C&C) servers instead of using a static list of preconfigured domain names that correspond C&C servers to make it more difficult to block those domain names. Some DGA detection techniques include analyzing the character distribution of domain names to determine those domains that appear to be natural language based (which may be an indicator that the domain is not generated by a DGA) and those domains that do not appear to be natural language based (which may be an indicator that the domain was generated by a DGA). However DGAs are evolving to be more natural language based in an attempt to avoid detection using those DGA detection techniques. However, with the collaborative and adaptive threat intelligence described herein, DGA detection includes both local data and global data thereby improving the accuracy of DGA detection.

For example, consider that there is a domain of a first language family (e.g., Chinese) that is in the domain corpus of the centralized controller 240 that has been assigned a 60% probability to be a DGA domain (e.g., based on character distribution analysis of the name), but it is not higher than 60% because the domain name is similar to other benign domains in the first language family (e.g., the first domain name is similar to other acronym domains in Chinese). A 60% probability is not very high and generally would lead to many false positives if action was taken on that domain (e.g., including that domain in a blacklist of blocked domains). However the probability can be improved for the domain based on a data analysis engine in a second language family (e.g., English) that normally does not receive data specifying traffic to Chinese domains with great frequency suddenly detecting a spike in traffic to the domain, which itself is suspicious. That information can be fed back to the centralized controller 240 which can update the probability that the domain is likely suspicious.

Figure 7:
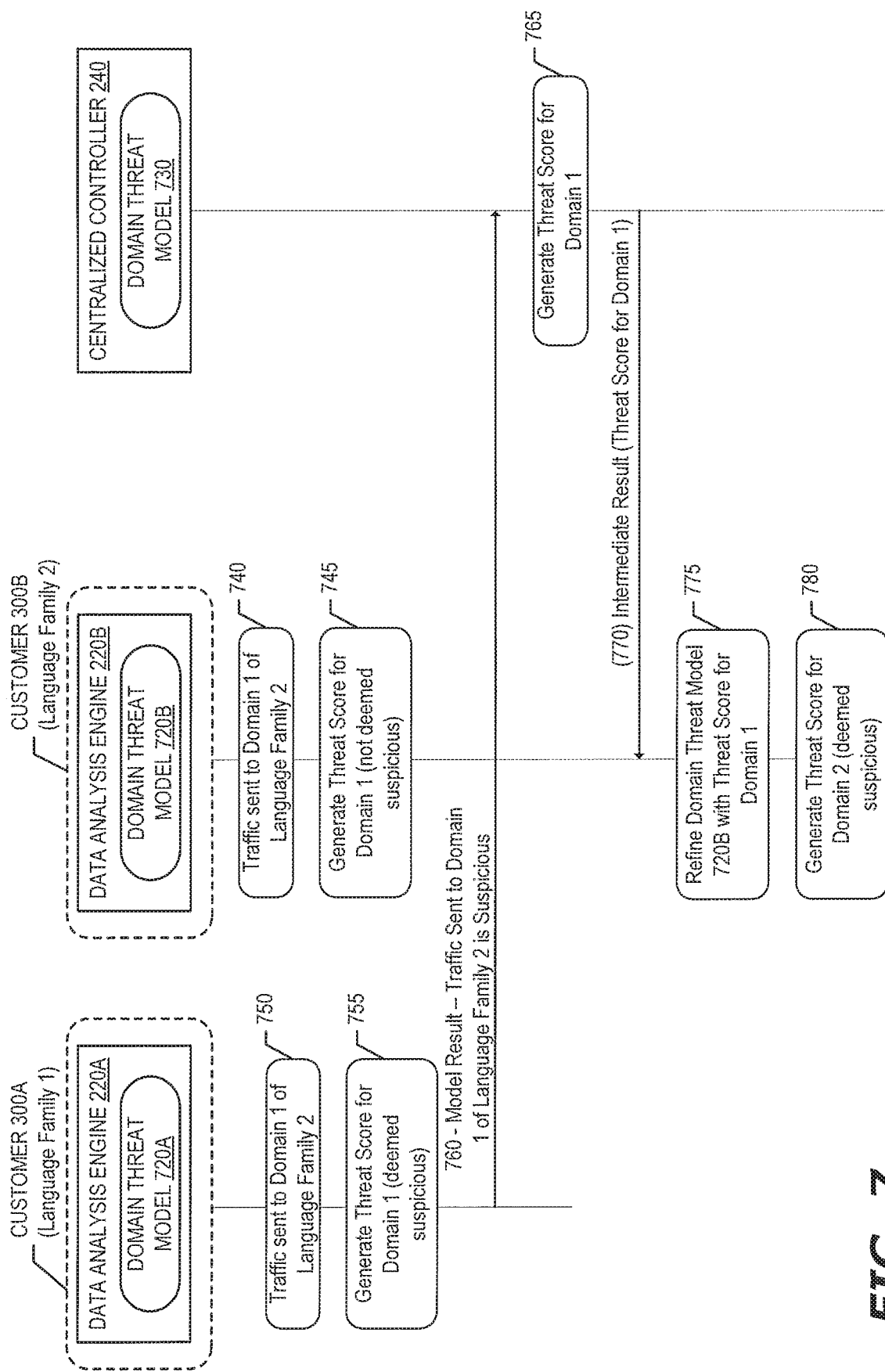
FIG. 7 illustrates an example of collaborative and adaptive threat intelligence for domain threat modeling according to one embodiment.

FIG. 7 illustrates an example of collaborative and adaptive threat intelligence for domain threat modeling according to one embodiment. The collaborative and adaptive threat intelligence illustrated in FIG. 7 may improve DGA detection in some embodiments. FIG. 7 illustrates customer 300A that typically receives and transmits traffic from language family 1 (e.g., English) and customer 300B that typically receives and transmits traffic from language family 2 (e.g., Chinese). The data analysis engines 220A-B of the customers 300A-B include the domain threat models 720A-B respectively. In one embodiment, the domain threat models 720A-B are the same (although working on different data). The domain threat models 720A-B may include DGA detection. The centralized controller 240 includes the domain threat model 730, which may be the same as the domain threat models 720A-B or may be different. At operation 740, the data analysis engine 220B detects traffic that is sent to domain 1 of language family 2. The data analysis engine 220B generates a threat score for domain 1 at operation 745 and deems that the domain 1 is not suspicious. At operation 750, the data analysis engine 220A detects traffic that is sent to domain 1 of language family 2. The data analysis engine 220A normally does not detect traffic sent to domains of language family 2. At operation 755 the data analysis engine 220A trains the domain threat model 720A using the detected traffic information and generates a threat score for domain 1 and deems that domain 1 is receiving suspicious traffic. At operation 760, the data analysis engine 220A transmits the model result to the centralized controller 240 that indicates that suspicious traffic is being sent to domain 1. At operation 730, the centralized controller 240 trains the domain threat model 730 using the received model result (and potentially other information related to the domain) to generate a threat score for domain 1. The centralized controller 240 transmits the intermediate result (the threat score for domain 1) to the data analysis engine 220B at operation 770. The data analysis engine 220B refines the domain threat model 720B with the threat score for domain 1 received from the centralized controller 240 at operation 775 and generates a threat score for domain 2 at operation 780.

Entity Group Based Profiling

There are techniques for profiling the behavior of an individual entity (e.g., user, machine, service, etc.) and monitoring that entity for anomalous behavior. However, behavior profiling on an individual entity has sensitivity and accuracy problems due to the dynamic changes of that individual entity that can legitimately occur. Traditional behavior profiling and detection based on an individual entity behavior can be either too sensitive leading to false positives, or too inaccurate leading to false negatives.

In one embodiment, entity group behavior modeling is performed where multiple entities in a group are profiled and monitored for anomalous behavior (e.g., abnormal group behavior, abnormal individual entity as compared to other entities of the group). An entity group includes entities that typically share at least a same characteristic such as: type, location, purpose, organization, or the like. For example, an entity group may include employees working in the same organization group (e.g., employees working in the legal department), employees working on the same campus, machines in the same data center, machines used to host the same services, and the like. An entity group may be configured (e.g., selection of members by a user) or may be automatically provisioned based on attribute(s) of the entities (e.g., automatically create an entity group that includes entities that share a same location).

In some embodiments, entity group behavior modeling is performed to detect anomalous behavior based on group behavior change. In such an embodiment, each individual entity of the entity group is profiled and monitored separately and anomalies are detected based on the common behavior change over multiple entities in the group. For example, an indicator of compromise may be determined if an entity group of machines is detected as performing different behavior than before during a certain period of time (e.g., visiting the same collection of previously unseen sites that members of the group have not previously visited).

In some embodiments, entity group behavior modeling is performed to detect anomalous behavior based on behavior of an entity of a first entity group abnormally matching behavior of entities of a second entity group. For example, users in an engineering group typically have some common behavior such as code check-out, code check-in, design document downloads, etc.; while users in a human resources group have different common behavior such as accessing biography records, hiring history, etc. An indicator of compromise may be determined if action(s) of an entity in a first entity group are not consistent with other entities in the first entity group but are instead consistent with actions commonly performed by entities in a second entity group. For example, an indicator of compromise may be determined if a human resources user belonging to a human resources department begins to behave like a member of the engineering group (e.g., the user belonging to the human resources department performs code check-in, which is typically not done by human resources department users but is typically performed by engineering group users).

In some embodiments, entity group behavior modeling is performed to detect anomalous behavior based on abnormal behavior of an entity of an entity group as compared to other entities of that same entity group. For example, different servers in the same functional group such as a web server group or database group are expected to behave similarly to each other over time. An indicator of compromise, or other problem such as server failure, may be determined if action(s) of an entity in the entity group are not consistent with other entities in that entity group. For example, an indicator of compromise or indicator of server failure may be determined if one server starts to behave differently than other servers of the same group (e.g., disk response latency increase, network response latency increase, etc.).

Figure 8:
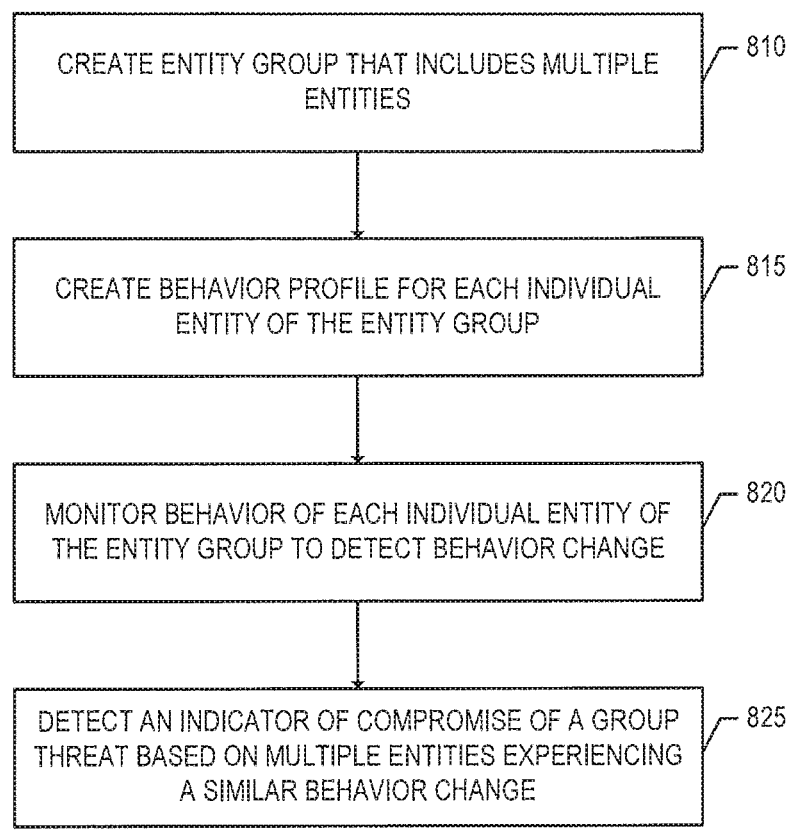
FIG. 8 is a flow diagram that illustrates exemplary operations for entity group behavior modeling according to one embodiment.

FIG. 8 is a flow diagram that illustrates exemplary operations for entity group behavior modeling according to one embodiment. The operations of FIG. 8 will be described with reference to the exemplary embodiment of FIG. 3. However, it should be understood that the operations of FIG. 8 can be performed by embodiments other than those described with reference to FIG. 3, and the embodiments discussed with reference to FIG. 3 can perform operations different than those described with respect to FIG. 8. For example, the operations of FIG. 8 may not be performed in the same exemplary architecture as described in FIG. 3. In a specific implementation, the operations of FIG. 8 are performed by a data analysis engine 220; while in other implementations the operations of FIG. 8 are performed by the centralized controller 240.

At operation 810, an entity group that includes multiple individual entities is created. In one embodiment, the entity group is created in response to receiving input from a customer or administrator that specifies the entities belonging to that entity group. In another embodiment, the entity group is automatically created and populated with individual entities based on attributes associated with those entities (e.g., same location, same type, same organization, etc.). In another embodiment, the entity group is automatically created and populated with individual entities that have previously shown similar behavior. For example, over time, users in a particular department (e.g., an engineering department, human resources department, legal department, etc.) may over time experience similar behavior. For example, users in an engineering department may have some common behavior such as code check-out, code check-in, design document downloads, etc., while users in a human resources department may have different common behavior such as accessing biography records, accessing hiring history records, etc. The entities may be monitored and grouped according to monitored similar behavior. The input to create the entity group may be received at the centralized controller 240 or a data analysis engine 220 in some embodiments.

Flow moves from operation 810 to operation 815 where a behavior profile is created for each individual entity of the entity group. As part of creating the behavior profile for each individual entity, a set of one or more features are adapted to be included as part of the profile and behavior is tracked across the set of features to determine what is normal behavior for the entity. The following are examples of features: destination IP address; countries of destination IP address; domains accessed; DNS queries; internal file downloads; server logins; duration of time that a user is using their machine or using the network; traffic volume sent by the entity; what machines the entity normally authenticates with; what applications are normally executed (which may also include a time component such as what applications are typically used in the morning, etc.); what machines the entity normally sends/receives traffic to/from; and what types of files are normally downloaded by the entity. It should be understood that these are example features and there may be more, different, or less features used when creating the behavior profile for the entity. In some embodiments the features that are included are configured such that a behavior profile can be established that distinguishes the entity against other entities and/or distinguishes an entity group against another entity group. The set of features can be configured by customers and/or automatically provisioned by the service. Traffic related to the set of features is collected. For example, the data analysis engine 220 receives metadata and other items of interest from the different network sensor engine(s) 200 (e.g., information from host telemetry data; network packets propagating to/from device(s) in the network; log information (e.g., Active Directory® server logs, DNS server logs, and DHCP server logs); and flow based connection records). The data analysis engine 220 extracts or derives the set of features from the collected traffic. The data analysis engine 220 then performs a clustering analysis to generate the behavior profile to generate a baseline of behavior of the entity for the different features. Any number of clustering algorithms may be used such as a hierarchical clustering algorithm, k-means clustering algorithm, and nearest neighbor clustering algorithm when performing the cluster analysis. The data analysis engine 220 may also use input received (e.g., from the customer) of expected behavior and use that input when generating the behavior profile. It should be understood that the centralized controller 240 may also generate the behavior profile to generate the baseline of behavior of the entities. In other embodiments, the behavior profile is created solely in response to receiving input (e.g., from the customer) of expected behavior for the entity.

Flow moves from operation 815 to operation 820 where behavior of each entity of the group is monitored across the set of features to detect a behavior change of each individual entity (behavior that does not conform to the expected profile of the entity for that feature). For example, for each feature used in the behavior profile, the historical distribution of the data is compared against new distribution of data to determine the amount of distance change. This comparison may be done through defining a distance measure for each feature and combining the distances from all features included in the behavior profile. By way of a specific example, in the case of a model for sent traffic volume feature for a particular entity, the data analysis engine 220 compares the historical distribution of traffic volume sent by that entity versus a new distribution of traffic volume to determine the amount of distance change (if any). A behavior change may be determined if the distance change is over a threshold amount, which may be configurable or different for each different feature.

Flow moves to operation 825 where an indicator of compromise of a group threat is detected based on multiple ones of the entities experiencing a similar behavior change. It should be understood that the common behavior change of the group of entities need not be the exact same change in some embodiments such as downloading the same previously unseen file or transmitting the same traffic to the same previously unseen server, etc. For each entity, the behavior change of that entity is monitored for one or more features (e.g., domain, IP address, filename, traffic volume, etc.) to find the distance change of current behavior versus historical behavior. The relative distance change of the group of entities is used to determine whether the behavior change overlaps. For example with respect to traffic volume, if a first entity historically transmits much more traffic than a second entity, a common behavior change may occur when the first entity and the second entity have similar (within a certain threshold or percentage) distance change such as the same percentage increase in traffic volume to the same previously unseen IP address or domain. The confidence level of the indicator of compromise of the group threat is relative to the number of entities experiencing the similar behavior change. For example, the data analysis engine 200 increases the confidence level of the indicator of compromise for each entity that is experiencing a similar behavior change. By way of example, if there is only a single entity that is experiencing a behavior change, the confidence level that the group of entities in which the single entity is a member is very low and increases as more entities of the group begin to experience similar behavior changes. For example, if multiple entities in the entity group begin to show different behavior than before during a certain period of time (e.g., visiting the same previously unseen site they have not been to before during a certain period of time), it may be an indicator of compromise. As a specific example, a common attack, referred to as a watering hole attack, includes placing malware onto a resource that is commonly accessed by certain entities (e.g., mobile application development professionals, healthcare professionals, etc.) to infect those entities. This malware may cause information of the infected entities to be uploaded to different malicious servers or cause other behavior of the entities to change, typically in a similar way.

Figure 9:
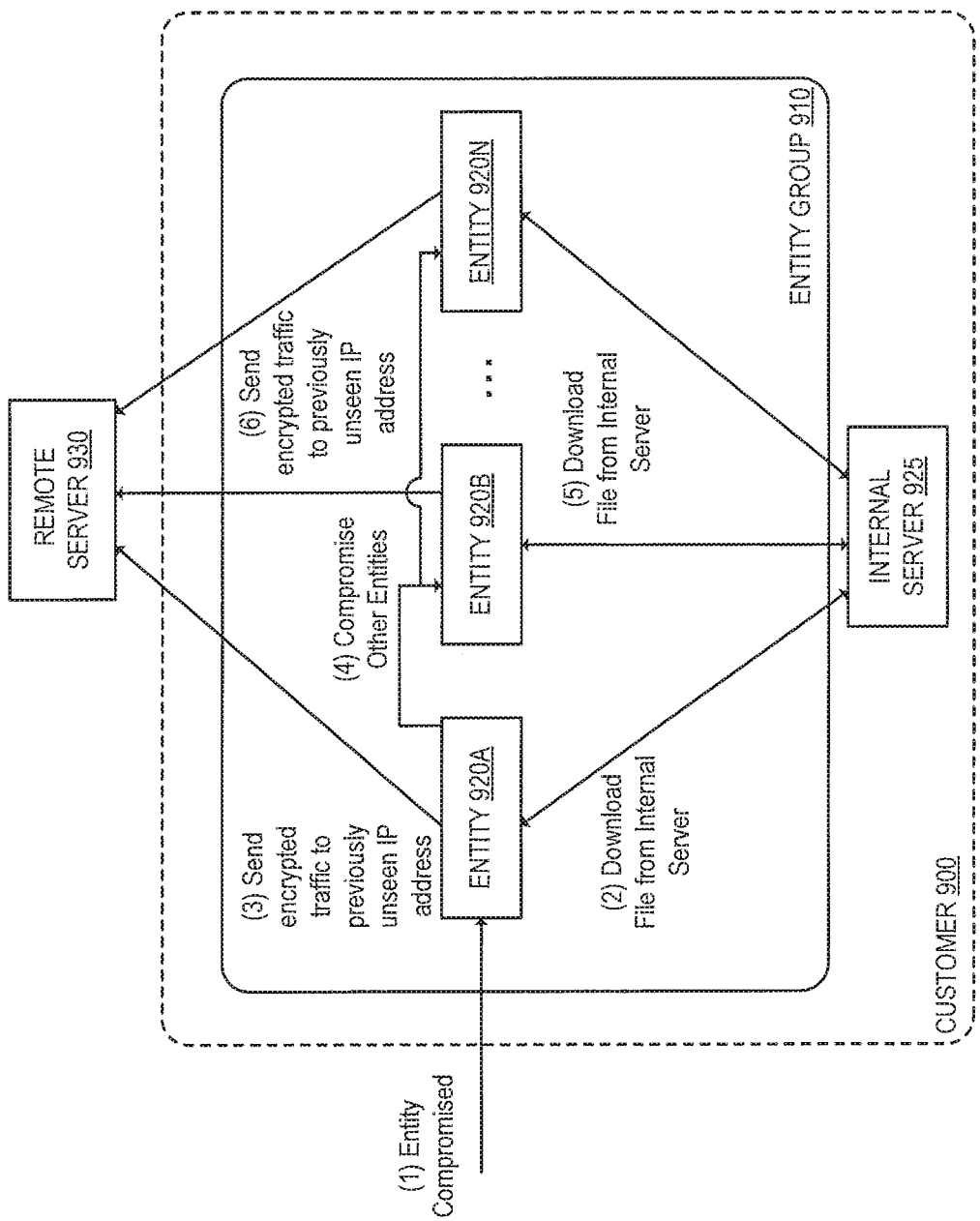
FIG. 9 illustrates an example of anomalous behavior that can be detected based on common behavior change of a group according to one embodiment.

FIG. 9 illustrates an example of anomalous behavior that can be detected based on common behavior change of a group according to one embodiment. As illustrated in FIG. 9, an entity group 910 and an internal server 925 belong to a customer 900. The entity group 910 includes entities 920A-N. At an operation 1, the entity 920A has been compromised. For example, malware has been installed on the entity 920A as a result of the entity 920 visiting an infected web page. The compromised entity 920A downloads a file from the internal server 925 at operation 2 and transmits encrypted traffic to a previously unseen IP address at operation 3 (e.g., that IP address has not been a destination for traffic previously captured on the network of the customer 900). The traffic may be encrypted in an attempt to defeat any outgoing security procedures in place on the network of the customer 900 that may scan outgoing traffic for filenames, file hashes, etc. The compromised entity 920A also compromises the entities 920B-N at operation 4. Although this example describes the compromised entity 920A compromising other entities 920B-N, the other entities could be compromised differently (e.g., by visiting the same infected web page as the entity 920A). The compromised entities 920B-N exhibit similar behavior as the compromised entity 920A including downloading a file from the internal server at operation 5 and transmitting encrypted traffic to a previously unseen IP address at operation 6.

In another embodiment, anomalous behavior is detected based on behavior of an entity of a first entity group abnormally matching behavior of entities of a second entity group. For example, users in an engineering group typically have some common behavior such as code check-out, code check-in, design document downloads, etc.; while users in a human resources group have different common behavior such as accessing biography records, hiring history, etc. An indicator of compromise may be determined if action(s) of an entity in a first entity group are not consistent with other entities in the first entity group but are instead consistent with actions commonly performed by entities in a second entity group. For example, an indicator of compromise may be determined if a human resources user belonging to a human resources department begins to behave like a member of the engineering group (e.g., the user belonging to the human resources department performs code check-in, which is typically not done by human resources department users but is typically performed by engineering group users).

Figure 10:
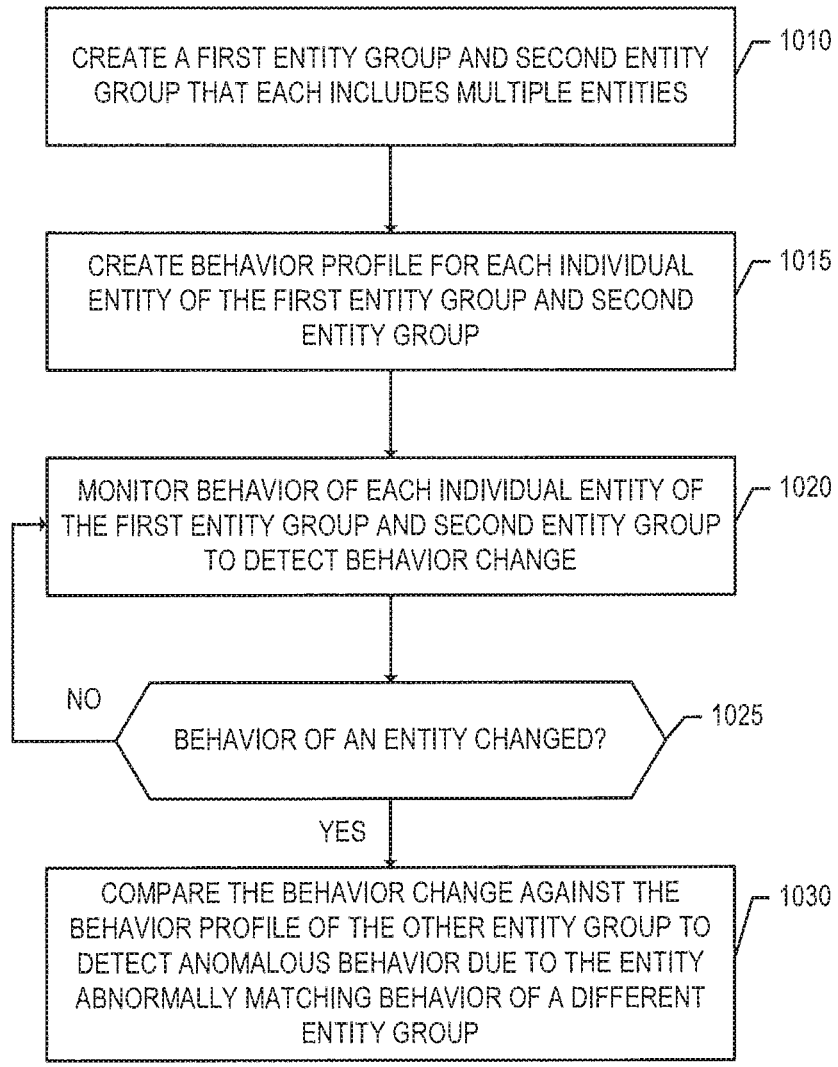
FIG. 10 is a flow diagram that illustrates exemplary operations for entity group behavior modeling where anomalous behavior is detected based on behavior of an entity in a first entity group abnormally matching behavior of entities of a second entity group according to one embodiment.

FIG. 10 is a flow diagram that illustrates exemplary operations for entity group behavior modeling where anomalous behavior is detected based on behavior of an entity in a first entity group abnormally matching behavior of entities of a second entity group according to one embodiment. The operations of FIG. 10 will be described with reference to the exemplary embodiment of FIG. 3. However, it should be understood that the operations of FIG. 10 can be performed by embodiments other than those described with reference to FIG. 3, and the embodiments discussed with reference to FIG. 3 can perform operations different than those described with respect to FIG. 10. For example, the operations of FIG. 10 may not be performed in the same exemplary architecture as described in FIG. 3. In a specific implementation, the operations of FIG. 10 are performed by a data analysis engine 220; while in other implementations the operations of FIG. 10 are performed by the centralized controller 240.

At operation 1010, a first entity group and a second entity group that each include multiple individual entities are created. The entity groups may be created in a similar way as described with respect to operation 810. Flow moves from operation 1010 to operation 1015 where, for each individual entity of the first entity group and the second entity group, a behavior profile is created for that entity. The behavior profiles may be created in a similar way as described with respect to operation 815. In some embodiments the features that are included in the behavior profile for each entity are chosen such that behavior of entities in the first entity group can be distinguished against behavior of entities the second entity group. For example, an action that is commonly performed by entities of each entity group may not be included as a feature in the behavior profile (e.g., if each user of the company commonly executes the same email program to access email); whereas actions that are expected to be unique to entities of a particular entity group may be included as a feature in the behavior profile. Flow moves from operation 1015 to operation 1020.

At operation 1020, behavior of each entity of each of the first and second entity groups is monitored to detect whether a behavior change is occurring for each individual entity (behavior that does not conform to the expected profile of the entity for that feature). For example, for each feature used in the behavior profile, the historical distribution of the data is compared against new distribution of data to determine the amount of distance change. This comparison may be done through defining a distance measure for each feature and combining the distances from all features included in the behavior profile. Flow moves from operation 1020 to operation 1025 where a determination is made whether the behavior of an entity has changed. For example, a behavior change may be determined if the distance change of a particular feature is over a threshold amount, which may be configurable or different for each different feature. If the behavior of an entity has not changed, flow moves back to operation 1020. If the behavior of an entity has changed, then flow moves to operation 1030.

At operation 1030, the behavior change of the entity is compared against the historical behavior of another entity group to detect anomalous behavior due to the entity abnormally matching behavior of a different entity group. For example, an indicator of compromise may be determined if an entity in the human resources group starts to take actions that are common to an engineering group such as checking-out code or downloading design documents (which are otherwise not common to entities in the human resources group). It should be understood that the changed behavior may be in addition to the normal behavior of that entity. For example, an entity may continue to take actions consistent with its entity group while also changing behavior to take actions consistent with a different entity group.

In another embodiment, the anomalous behavior is detected based on abnormal behavior of an entity of an entity group as compared to other entities of that same entity group. For example, different servers in the same functional group such as a web server group or database group are expected to behave similarly to each other over time. An indicator of compromise, or other problem such as server failure, may be determined if action(s) of an entity in the entity group are not consistent with other entities in that entity group. For example, an indicator of compromise or indicator of server failure may be determined if one server starts to behave differently than other servers of the same group (e.g., disk response latency increase, network response latency increase, etc.).

Figure 11:
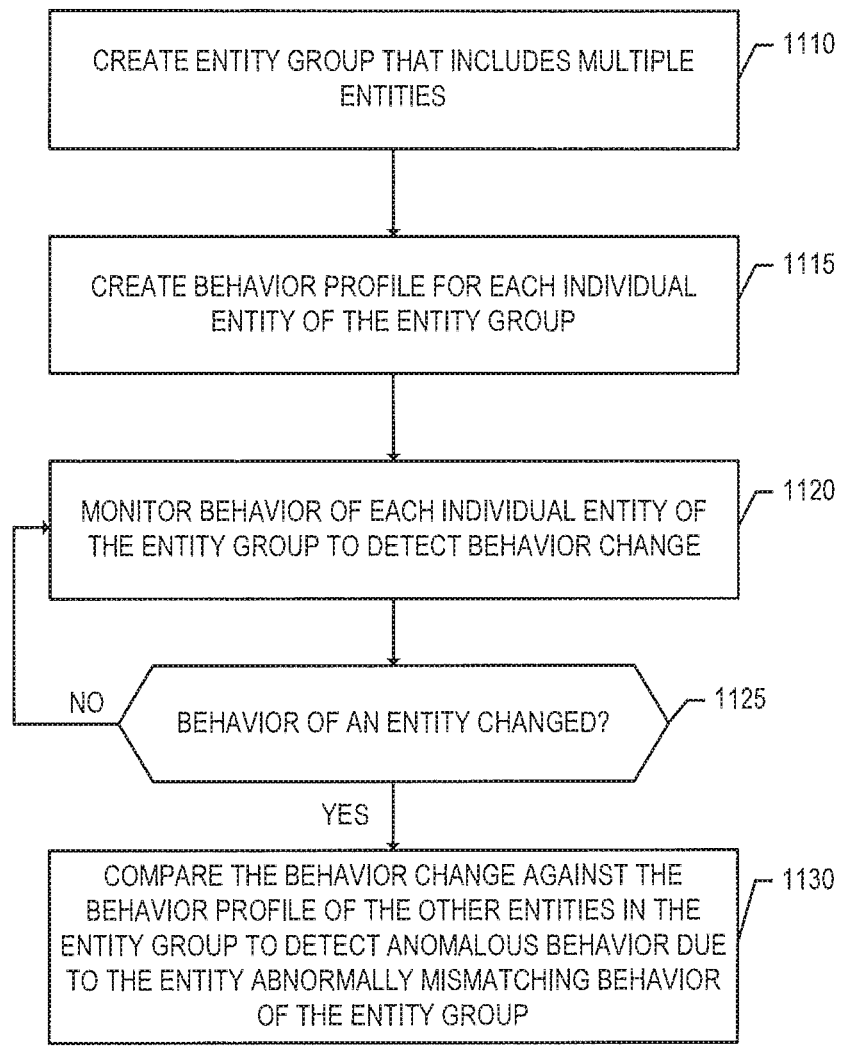
FIG. 11 is a flow diagram that illustrates exemplary operations for entity group behavior modeling where anomalous behavior is detected based on behavior of an entity in an entity group mismatching behavior of other entities in the same entity group according to one embodiment.

FIG. 11 is a flow diagram that illustrates exemplary operations for entity group behavior modeling where anomalous behavior is detected based on behavior of an entity in an entity group mismatching behavior of other entities in the same entity group according to one embodiment. The operations of FIG. 11 will be described with reference to the exemplary embodiment of FIG. 3. However, it should be understood that the operations of FIG. 11 can be performed by embodiments other than those described with reference to FIG. 3, and the embodiments discussed with reference to FIG. 3 can perform operations different than those described with respect to FIG. 11. For example, the operations of FIG. 11 may not be performed in the same exemplary architecture as described in FIG. 3. In a specific implementation, the operations of FIG. 11 are performed by a data analysis engine 220; while in other implementations the operations of FIG. 11 are performed by the centralized controller 240.

At operation 1110, an entity group that includes multiple individual entities is created. The entity group may be created in a similar way as described with respect to operation 810. Flow moves from operation 1110 to operation 1115 where, for each individual entity of the entity group, a behavior profile is created for that entity. The behavior profiles may be created in a similar way as described with respect to operation 815. Flow moves from operation 1115 to operation 1120. At operation 1120, the behavior of each entity the entity group is monitored to detect a behavior change (behavior that does not conform to the expected profile of the entity for that feature), which may be performed similarly as operation 820. Flow then moves to operation 1125 where a determination is made whether the behavior of an entity has changed. For example, a behavior change may be determined if the distance change of a particular feature is over a threshold amount, which may be configurable or different for each different feature. If the behavior of an entity has not changed, flow moves back to operation 1120. If the behavior of an entity has changed, then flow moves to operation 1130.

At operation 1130, the behavior change of the entity is compared against the behavior of the other entities in the entity group to detect anomalous behavior due to the entity abnormally mismatching behavior of the entity group in which that entity belongs. For example, an indicator of compromise or indicator of server failure may be determined if one server starts to behave differently than other servers of the same group (e.g., disk response latency increase, network response latency increase, etc.).

Figure 12:
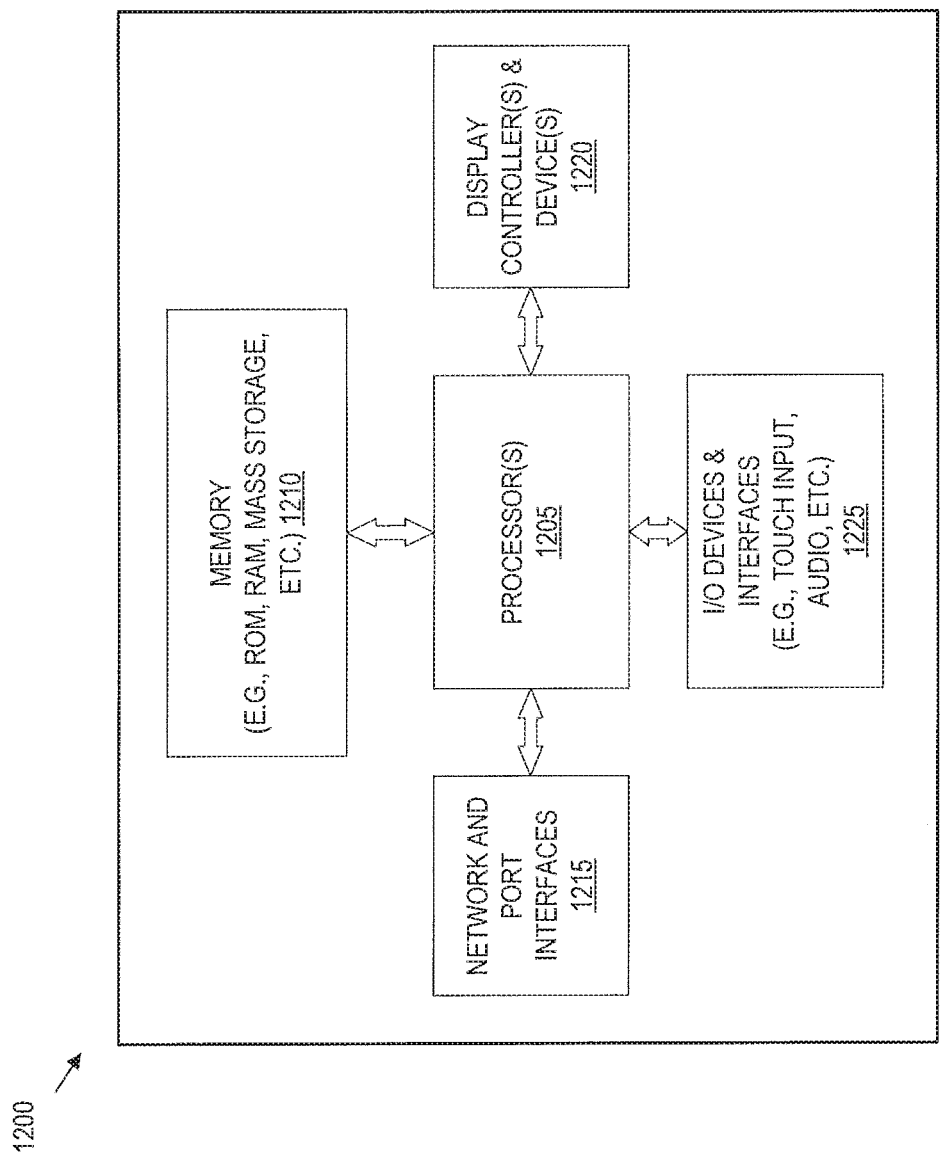
FIG. 12 illustrates a block diagram of an exemplary data processing system that may be used in some embodiments.

FIG. 12 illustrates a block diagram for an exemplary data processing system 1200 that may be used in some embodiments. Data processing system 1200 includes one or more microprocessors 1205 and connected system components (e.g., multiple connected chips). Alternatively, the data processing system 1200 is a system on a chip. One or more such data processing systems 1200 may be utilized to implement the functionality of the endpoint devices 170, network sensor engines 200, data analysis engines 220, and/or centralized controller 240.

The data processing system 1200 includes memory 1210, which is coupled to the microprocessor(s) 1205. The memory 1210 may be used for storing data, metadata, and programs for execution by the microprocessor(s) 1205. The memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1210 may be internal or distributed memory.

The data processing system 1200 also includes an audio input/output subsystem 1215 which may include a microphone and/or a speaker for, for example, playing back music or other audio, receiving voice instructions to be executed by the microprocessor(s) 1205, playing audio notifications, etc. A display controller and display device 1220 provides a visual user interface for the user, e.g., GUI elements or windows. The data processing system 1200 also includes one or more input or output ("I/O") devices and interfaces 1225, which are provided to allow a user to provide input to, receive output from, and otherwise transfer data to and from the system. These I/O devices 1225 may include a mouse, keypad, keyboard, a touch panel or a multi-touch input panel, camera, optical scanner, network interface, modem, other known I/O devices or a combination of such I/O devices. The I/O devices and interfaces 1225 may also include a connector for a dock or a connector for a USB interface, FireWire, Thunderbolt, Ethernet, etc., to connect the system 1200 with another device, external component, or a network. Exemplary I/O devices and interfaces 1225 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1200 with another device, external component, or a network and receive stored instructions, data, tokens, etc. It will be appreciated that one or more buses may be used to interconnect the various components shown in FIG. 12. It will be appreciated that additional components, not shown, may also be part of the system 1200, and, in certain embodiments, fewer components than that shown in FIG. 12 may also be used in a data processing system 1200.

The techniques shown in the figures can be implemented using code and data stored and executed on one or more electronic devices (e.g., a network device). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touch-screen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   creating, by a multi-tier security framework, a first entity group that includes a first plurality of entities, wherein each one of the first plurality of entities represents one of a user, a machine, and a service;
   creating, by the multi-tier security framework, a first behavior profile for one or more of the first plurality of entities of the first entity group;
   monitoring, by the multi-tier security framework, behavior of each one of the first plurality of entities of the first entity group to detect behavior change;
   detecting an indicator of compromise based on the behavior change of an entity of interest compared with the first behavior profile of at least one entity of the first entity group, wherein detecting the indicator of compromise based on the behavior change of the entity of interest compared with the first behavior profile comprises determining that the behavior change is inconsistent with a common behavior of the first plurality of entities according to the first behavior profile and determining, according to a second behavior profile of a second entity group, that the behavior change is abnormally consistent with a common behavior of a second plurality of entities of the second entity group at least in part by determining that the behavior change represents a behavior that is not unauthorized for a member of the first entity group but which is performed less than a threshold number of times by the first plurality of entities in the first entity group;
   responsive to detecting the indicator of compromise, identifying a portion of data related to processing of the entity of interest;
   transmitting the indicator of compromise and the identified portion of data to a central computer for analysis; and
   receiving, from the central computer, result data associated with the analysis, the result data including at least one of i) results of training a global model to detect the indicator of compromise or ii) information for refining a local model to detect the indicator of compromise.

2. The method of claim 1, wherein the processing occurs at a time prior to the detection of the indicator of compromise.

3. The method of claim 1, wherein the processing occurs at a time after the detection of the indicator of compromise.

4. The method of claim 1, wherein the information for refining the local model comprises at least one of: i) information specifying a feature modification for the local model, ii) intermediate results of training the global model, or iii) a modification to an algorithm of the local model.

5. The method of claim 4, wherein the feature modification for the local model comprises at least one of: i) removing a first feature from the local model, ii) prioritizing a second feature of the local mode, or iii) adding a third feature to the local model.

6. The method of claim 1, wherein creating the first entity group is performed responsive to receiving input from a user that specifies the first plurality of entities belonging to the first entity group.

7. The method of claim 1, wherein creating the first entity group comprises automatically populating the first entity group with the first plurality of entities based on a set of one or more attributes common to the first plurality of entities.

8. The method of claim 1, wherein creating the first entity group comprises automatically populating the first entity group with the first plurality of entities based on the first plurality of entities previously showing similar behavior.

9. The method of claim 1, wherein the created first behavior profile for the one or more of the first plurality of entities of the first entity group includes a set of one or more features that are used to distinguish behavior between the first plurality of entities.

10. The method of claim 1, wherein the created behavior profile for the one or more of the first plurality of entities of the first entity group includes a set of one or more features that are used to distinguish behavior of the first entity group as compared to behavior of a different entity group.

11. The method of claim 10, wherein the set of features are extracted or derived from metadata and other items of interest including one or more of: network packets propagating to/from devices, log information, and flow based connection records.

12. The method of claim 1, wherein detecting the indicator of compromise comprises determining that an indicator of compromise threshold has been exceeded for the entity of interest, and wherein identifying the portion of data related to processing of the entity of interest comprises identifying the portion of data related to processing that occurred after a trigger threshold is exceeded, the trigger threshold being lower than the compromise threshold.

13. The method of claim 1, wherein the entity of interest is a first entity of interest, the method further comprising:
   detecting an indicator of compromise based on a common behavior change of a second entity and a third entity of the first plurality of entities, wherein detecting the common behavior change comprises:
      determining that a historical behavior of the second entity differs from a historical behavior of the third entity by a first threshold amount;
      determining a first distance change between a current behavior of the second entity and the historical behavior of the second entity;
      determining a second distance change between a current behavior of the third entity and the historical behavior of the third entity;
      determining a relative distance change as a difference between the first distance change and the second distance change; and
      determining that the relative distance change is within a second threshold amount.

14. The method of claim 13, further comprising detecting a confidence level of the indicator of compromise relative to a number of the first plurality of entities experiencing the common behavior change.

15. The method of claim 1, wherein the indicator of compromise is a first indicator of compromise and the entity of interest is a first entity of interest, the method further comprising:
   detecting a second indicator of compromise of a second entity of interest based on a behavior change of the second entity of interest that deviates from behavior of other entities in the first entity group.

16. A non-transitory machine-readable storage medium that provides instructions that, when executed by a processor, causes the processor to:
   create a first entity group that includes a first plurality of entities, wherein each one of the first plurality of entities represents one of a user, a machine, and a service;
   create a first behavior profile for one or more of the first plurality of entities of the first entity group;
   monitor behavior of each one of the first plurality of entities of the first entity group to detect behavior change;
   detect an indicator of compromise based on the behavior change of an entity of interest compared with the first behavior profile of at least one entity of the first entity group, wherein detecting the indicator of compromise based on the behavior change of the entity of interest compared with the first behavior profile comprises determining that the behavior change is inconsistent with a common behavior of the first plurality of entities according to the first behavior profile and determining, according to a second behavior profile of a second entity group, that the behavior change is abnormally consistent with a common behavior of a second plurality of entities of the second entity group at least in part by determining that the behavior change represents a behavior that is not unauthorized for a member of the first entity group but which is performed less than a threshold number of times by the first plurality of entities in the first entity group;
   responsive to detecting the indicator of compromise, identifying a portion of data related to processing of the entity of interest;
   transmit the indicator of compromise and the identified portion of data to a central computer for analysis; and
   receive, from the central computer, result data associated with the analysis, the result data including at least one of i) results of training a global model to detect the indicator of compromise or ii) information for refining a local model to detect the indicator of compromise.

17. The non-transitory machine-readable storage medium of claim 16, wherein the information for refining the local model comprises at least one of: i) information specifying a feature modification for the local model, ii) intermediate results of training the global model, or iii) a modification to an algorithm of the local model.

18. An apparatus for collaborative and adaptive threat intelligence, comprising:
   a processor; and
   a non-transitory machine-readable storage medium containing instructions, that when executed by said processor, cause said apparatus to:
      create an entity group that includes a plurality of entities, wherein each one of the plurality of entities represents one of a user, a machine, and a service;
      create a behavior profile for one or more of the plurality of entities of the entity group;
      monitor behavior of each one of the plurality of entities of the entity group to detect behavior change;
      detect an indicator of compromise based on an anomalous common behavior change of a first entity and a second entity of the plurality of entities, wherein detecting the, wherein, to detect the common behavior change, said processor executes said instructions to further cause the apparatus to:
         determine that a historical behavior of the first entity differs from a historical behavior of the second entity by a first threshold amount;
         determine a first deviation between a current behavior of the first entity and the historical behavior of the first entity;
         determine a second deviation between a current behavior of the second entity and the historical behavior of the second entity;
         determine a relative deviation as a difference between the first deviation and the second deviation; and
         determine that the relative deviation is within a second threshold amount;
      responsive to detection of the indicator of compromise, identify a portion of data related to processing of the entity of interest;
      transmit the indicator of compromise and the identified portion of data to a central computer for analysis; and
      receive, from the central computer, result data associated with the analysis, the result data including at least one of i) results of training a global model to detect the indicator of compromise or ii) information for refining a local model to detect the indicator of compromise.

19. The non-transitory machine-readable storage medium of claim 18, wherein creation of the first entity group is performed responsive to receiving input from a user that specifies the first plurality of entities belonging to the first entity group.

20. The method of claim 18, wherein creating the behavior profile for a first entity in the first entity group comprises:
   determining that a first action is unique to the plurality of entities in the entity group;
   including a first feature representative of the first action in the behavior profile for the first entity;

determining that a second action is commonly performed by the plurality of entities of the first entity group and entities of the second entity group; and excluding the second action from the behavior profile for the first entity.

\* \* \* \* \*